United States Patent [19]

Colgate

[11] Patent Number: 4,663,938
[45] Date of Patent: May 12, 1987

[54] ADIABATIC POSITIVE DISPLACEMENT MACHINERY

[75] Inventor: Stirling A. Colgate, Los Alamos, N. Mex.

[73] Assignee: Colgate Thermodynamics Co., Princeton, N.J.

[21] Appl. No.: 688,266

[22] Filed: Jan. 2, 1985

Related U.S. Application Data

[63] Continuation of Ser. No. 302,167, Sep. 14, 1981, abandoned.

[51] Int. Cl.$^4$ .................. F02B 37/00; F01L 15/02; F01L 7/02; F04B 39/10
[52] U.S. Cl. .......................................... 60/620; 91/50; 91/188; 91/457; 123/70 V; 123/81 C; 123/308; 123/559; 417/457; 417/490; 417/542
[58] Field of Search ............... 417/454, 457, 490, 510

[56] References Cited

U.S. PATENT DOCUMENTS

| | | | |
|---|---|---|---|
| 1,662,597 | 3/1928 | Baldwin | 123/81 C |
| 1,899,217 | 2/1933 | Taylor | 123/81 C |
| 2,044,522 | 6/1936 | Wurtele | 123/296 |
| 2,054,963 | 9/1936 | Atteslander | 123/65 C |
| 2,239,922 | 4/1941 | Martinka | 60/620 |
| 2,255,925 | 9/1941 | Heylandt | 60/620 |
| 2,258,426 | 10/1941 | Smith | 417/510 |
| 2,309,968 | 2/1943 | Marburg | 60/620 |
| 3,267,661 | 8/1966 | Petrie | 60/598 |
| 3,362,391 | 1/1968 | Lindsay | 417/510 |
| 4,138,931 | 2/1979 | Hermann | 417/399 |

FOREIGN PATENT DOCUMENTS

| | | | |
|---|---|---|---|
| 739710 | 1/1933 | France | 123/312 |
| 1084655 | 7/1954 | France | 123/70 R |
| 1126878 | 7/1956 | France | 123/312 |
| 362453 | 12/1931 | United Kingdom | 123/65 W |
| 371533 | 4/1932 | United Kingdom | 123/65 VC |
| 382670 | 10/1932 | United Kingdom | 123/312 |
| 541963 | 12/1941 | United Kingdom | 123/65 W |

OTHER PUBLICATIONS

Judge, A. W. *High Speed Diesel Engines*, pp. 126, 127, 1957.
Annand et al., *Gas Flow in the Internal Combustion Engine*, p. 13, 1974.

Primary Examiner—Douglas Hart
Attorney, Agent, or Firm—Brumbaugh, Graves, Donohue & Raymond

[57] ABSTRACT

Adiabatic positive displacement gas cycle machinery is designed with explicit control of the heat flow between the gas and the walls. The control is achieved by maintaining near-laminar flow and a small wall area to volume ratio. The most stable near-laminar flow in a cylinder is an axial vortex because of symmetry, and hence the induction port design should establish an axial vortex and a low velocity. Induction and exhaust port designs to achieve this flow are applied to a vane pump, an adiabatic air compressor, a diesel engine, and two and four stroke Otto cycle engines. The gain in thermal efficiency for these designs can be significant, up to a factor of 2, since the largest inefficiency in nearly all positive displacement machinery is imperfect control of heat flow.

27 Claims, 20 Drawing Figures

ADIABATIC POSITIVE DISPLACEMENT MACHINERY

BACKGROUND OF THE INVENTION

Introduction

This application is a continuation of application Ser. No. 302,167, filed on Sept. 14, 1981, and now abandoned.

There are in general two types of machinery used to do either work on, or have work done by, the compression or expansion of gases. These two generic types of machinery are positive displacement and turbine. The positive displacement type includes various mechanically driven or driving pistons or vane type rotors. A volume of gas is carried at relatively low velocity from one volume to a different one, either larger or smaller depending upon the function of compressor or engine. In the other type of machinery, turbines, the gas flow through blades occurs at a velocity of roughly the speed of sound of the gas. It is well known to those designing such machinery that the turbines can be made more efficient than positive displacement machinery. The reason for this difference in efficiency has frequently been obscure. A knowledge of the source of this inefficiency will allow positive displacement machinery to be designed in a fashion such that the inefficiency or loss is reduced by a significant factor to a minimal value. There is, of course, the well-recognized, additional loss of energy in positive displacement machinery due to the friction between whatever is the displacer, piston or vanes, and the walls of the chamber. The turbine in turn avoids this inefficiency but has others such as the friction of aerodynamic flow at velocities near the sound speed.

HEAT EXCHANGE AND TOTAL ENERGY LOSS

Frictional loss between sliding parts is important, but not usually the principal energy loss in the system. However, I will focus on one property of positive displacement machinery that does cause a major inefficiency and that is not well understood. This is the heat exchange between the gases being compressed or expanded and the walls of the positive displacement volume. This heat exchange is usually accepted as fundamental. Instead, I claim it can be significantly reduced.

HEAT EXCHANGE WITH THE WALLS

Let us consider first compressors, although these comments can be equally applied to expansion engines with an inversion of terms. If a gas is adiabatically compressed, it becomes both hotter as a function of compression as well as increased in pressure. The increase in temperature and pressure follow the well known relations of the adiabatic law. In some cases, as in an air compressor, the additional temperature created in the gas is later rejected as a nuisance, although a significant fraction, even a major fraction, of the useful work may be wasted in the rejection of this heat. In the peculiar case of an air compressor, where this heat is rejected, it is more efficient to reject this heat as early in the cycle as possible so that less work is done achieving a desired volume of cold compressed gas. (Isothermal machinery is the subject of my concurrently filed patent application granted as U.S. Pat. No. 4,490,974 dated Jan. 1, 1985 entitled "Isothermal Positive Displacement Machinery".) In other cases where a compressor is used, as in a Rankine cycle heat pump or compression cycle of various internal combustion engines, this departure from an adiabatic compression due to heat exchange of the working fluid, i.e. gas, with the walls of the compressor is a major disadvantage and inefficiency of the system. A point of this invention is that by proper design of the input and output ports of adiabatic positive displacement machinery this heat exchange can be reduced to a small value.

The mechanism for this heat loss is turbulent motion of the working fluid making contact with the walls during compression or expansion. There are two parts to this heat exchange: (1) the heat exchange between the gas and the wall if the wall were held isothermal, and (2) the heat impedance of the wall itself. It turns out that the heat impedance of the wall is such that the wall acts as a time lag averaging reservoir coming to a temperature equal to the mean temperature of the gas at a delayed phase of the stroke. The time phase lag as well as the magnitude of heat exchange are both detrimental to adiabatic efficiency.

THERMAL SKIN DEPTH

One can calculate the heat mass of the wall during the transient contact with the gas by calculating the thermal skin depth within the time of heat contact. The thermal skin depth, d, of penetration of heat (or cold) within the given time t is expressed mathematically as $$d = [(K/C_V)t]^{\frac{1}{2}}$$

where $C_V$ is the specific heat of the wall material, K is thermal conductivity, and t is the time. $(K/C_V)$ is often called the diffusion coefficient. For typical materials where $C_V$ is 1 calorie cm$^{-3}$ deg$^{-1}$, and the time = $10^{-2}$ sec (for a stroke at 3000 RMP) or longer, the skin depth will vary between $3 \times 10^{-3}$ cm for a plastic with $K = 10^{-3}$ cal cm$^{-3}$ deg$^{-1}$ at the highest speed to $3 \times 10^{-2}$ cm for a metal and a large slow piston. Even the smallest skin depth corresponds to a heat mass equivalent to several centimeters of air or freon at atmospheric pressure. Therefore the heat mass of the wall in contact with the gas will be comparable to or larger than the heat mass of the gas. It is usual in engineering practice to neglect this skin depth factor and assume that the wall takes on a temperature which is the time average of the heat flow from the gas. In this case the primary factor in determining heat loss is the theoretical heat exchange of the gas with an assumed isothermal wall almost independent of wall properties. Later I will show the importance of the time dependent phase lag of the heat flow. First I will demonstrate the skin depth effect. We assume that the walls of the chamber will be smooth and then the heat loss will be governed by the turbulent flow exchange with a smooth wall.

EXPLANATION OF DIFFUSIVE HEAT FLOW

In FIG. 1 I show the classic solution of the diffusion of heat from one reservoir 1 into a second reservoir 2. Let us assume that 1 is hotter at $T_1$ and is a turbulent gas with essentially infinite ability to transport heat up to a barrier 3. The heat diffuses into, or out of, region 2 with a diffusivity $K/C_V$. Then the distribution of heat or temperature, T, as a function of depth, x, follows a sequence of "error function" solutions in which $$T = T_2 + (T_1 - T_2) \exp(-x^2/d^2)$$

or $$T = T_2 + (T_1 - T_2)e^{(-x^2/d^2)}$$

where as before $$d = [(K/C_V t)]^{\frac{1}{2}}$$

The distance d is the centroid of the depth of penetration of the thermal wave. The three curves labeled $d_1$, $d_2$, $d_3$ are the temperature profiles of times $t_1$, $t_2$, $t_3$ where $t_1$ $t_2$ $t_3$ with characteristic skin depths $d_1$ is less than $d_2$ is less than $d_3$. If $T_1$ is time dependent as it would be in a cylinder with alternatively hot or cold gases, then the actual distribution of temperature should be a simple addition of such solutions. In this sense "cold", i.e. $T_1$ is less than $T_2$, can penetrate into the wall just as well as hot, $T_1$ is greater than $T_2$. The skin depth is just the characteristic averaging depth of each temperature variation in a time t. The heat mass described by each curve is $H = (T_1 - T_2)C_V$ and hence the longer the time the heat has to "soak" in, the greater the heat transferred. Typical diffusivities and skin depth heat masses are shown in Table 1 for various materials. A frequency of 3000 RPM is chosen as an example and the skin depth heat mass is compared to 8:1 compressed combustion gases typical of an Otto cycle engine.

TABLE 1

Diffusivity, skin depth, heat mass of various materials
assume 3000 RPM, t = 1/(2 f) = 0.01 sec.

| | Thermal Conductivity watts/cm$^2$ | Heat Capacity Cal cm$^{-3}$ | Diffusivity K/C$_V$ cm$^2$ sec$^{-1}$ | Heat mass of skin depth C$_V$(Dt)$^{\frac{1}{2}}$ cal cm$^{-2}$ |
|---|---|---|---|---|
| Carbon Steel | 0.5 | 0.81 | 0.13 | 0.0164 |
| Stainless Steel | 0.14 | 0.81 | 0.036 | 0.0087 |
| Nickle-Chrome | 0.11 | 0.81 | 0.028 | 0.0076 |
| Phosphorus Bronze | 2.2 | 0.84 | 0.55 | 0.035 |
| Berylilium Copper | 0.8 | 0.84 | 0.20 | 0.021 |
| Aluminum Alloy | 1.6 | 0.58 | 0.57 | 0.025 |
| Carbon Coke | 0.28 | 0.3 | 0.2 | 0.0075 |
| Aluminum Oxide Ceramic | 0.30 | 0.8 | 0.08 | 0.013 |
| Silicon Dioxide Fused | 0.016 | 0.8 | 0.004 | 0.003 |

Heat capacity of air plus fuel 8 fold compressed = $5 \times 10^{-3}$ cal cm$^{-3}$

TURBULENT HEAT EXCHANGE WITH A SMOOTH SURFACE

If a gas flows in a smooth-wall pipe, then the properties of turbulent fluid heat exchange are such that the gas will reach thermal equilibrium with the wall after moving roughly 50 pipe diameters (American Handbook of Physics, 1963). This is also the viscous slowing down length, or the length in which kinetic energy is dissipated. The quantity "50 pipe diameters" is determined by the peculiar properties of the laminar sublayer. This is the boundary layer between turbulent fluid flow and smooth pipe wall. In the case of the cylinder or other compression volume the appropriate consideration is the distance the fluid (or gas) travels in contact with the wall during the time of a stroke. If the gas enters from a valve with a high velocity relative to the chamber, then the gas will circulate many times within the compression chamber during the time of a compression or expansion stroke. The number of cycles of circulation can be roughly estimated by the ratio of the velocity of the gases entering through the input valve to the velocity of the piston. The average ratio of the valve area to piston area is frequently about 20 to 1 (Taylor, 1966), so that gases entering the cylinder have velocities between 10 to 20 times that of the piston velocity. In general the gases enter the chamber non-symetrically with respect to the compression volume so that the turbulence generated by the flow will be greater than that induced in a normal pipe flow of a fluid moving through a pipe. Therefore the heat exchange with the wall will be greater when the turbulence is greater. We expect heat to be exchanged between the gas and the wall roughly 2.7 times more with the highly turbulent induction than with normal pipe flow within roughly 10 circulation times because the gas flowing by corners will be more turbulent than straight pipe flow. Therefore the typical piston with restricted inlet valves will allow heat exchange of the gas with the wall of roughly half the differential heat of the gas during the time of compression or expansion stroke. Since the differential temperature of the wall relative to the gas is roughly $\frac{1}{2}$ the total temperature difference, then roughly $\frac{1}{4}$ of the heat is lost to the wall. It is this large heat exchange which accounts for the primary inefficiency of such gas handling machines. The only way to avoid this heat loss is to allow the gases to enter the compression volume with low velocities. Then the distance the gas moves during a stroke is small (measured in diameters) and the heat exchange will be small. If the flow velocity of the entering gas carefully matches the velocity of the piston or other compression members, then we expect a weakly turbulent boundary layer, i.e. not perfect laminar flow but instead a low turbulence. The near absence of turbulence I call near-laminar flow and hence the crucial design is to create near-laminar flow of the input gas to the compression or expansion cycle. If the flow is to be near-laminar, at the piston velocity, then the inlet port area must be close to the full piston area. Or similarly in an expansion engine the inlet ports must again be equal to the piston area. This also applies to rotating vane machinery.

THE INEFFICIENCY DUE TO THE EXCHANGE OF HEAT OF THE GAS WITH THE WALL IN AN ADIABATIC CYCLE

Suppose a gas initially at temperature $T_1$ is compressed such that its final temperature would be $T_3$ if it were a perfect adiabatic compression but instead is held isothermally at an intermediate temperature $T_2$ during the latter part of compression. Then $T_1$ is less than $T_2$ is less than $T_3$, and then the heat energy in the gas after it leaves the piston will be less than it would be by the ratio $T_2/T_3$. (The mass of the gas is conserved). Therefore the inefficiency factor or the heat loss is just the difference $(T_3 - T_2)$ divided by the heat that would have been in the gas $(T_3 - T_1)$. Depending upon the cooling of the cylinder walls and other factors $T_2$ might be only half way between $T_1$ and $T_3$, and therefore compression machinery would be 50% efficient in following an adiabatic compression. The temperature $T_2$ that the wall reaches will be a complicated function of the heat exchange process and the cooling of the walls.

In general the gas will not come into equilibrium at every point in the stroke, and so only an approximation to this heat loss will actually occur. However, the fact that a simple calculation indicates that up to 50% of the theoretical maximum heat can be exchanged is sufficient reason to try to design machinery where one avoids this heat short circuit and its attendant loss in efficiency.

If the wall remained isothermal at temperature $T_2$, then this heat loss to the walls would be an actual advantage in a compressor as, for example, a refrigeration cycle or normal air compressor. However, the heat exchange of the gas to the wall is more complicated than this. If the gas can lose heat to the wall in part of the cycle it can also gain heat from the wall in another part of the cycle if the wall is hotter than the gas. The wall will be hotter than the gas for a transient time due to the skin depth effect. This latter effect of heating the gas from the wall is particularly harmful to the efficiency of the compressor because the heating of the gas occurs at its induction when the wall is hotter than the inlet gas. The gas is then compressed with higher heat than the ideal adiabatic cycle, and hence more work is required than would be required for the idealized cycle. Thus the heat is exchanged with a harmful phase lag. Let us illustrate these ideal cycles with and without heat exchange with the wall, FIG. 2.

The gas is drawn into the cylinder during the induction stroke starting at temperature $T_o$ along the constant pressure $P_o$ to the volume, $V_o$. In the ideal cycle it starts compression at volume, $V_o$ along the pure adiabatic curve 1, reaching the final reservoir pressure $P_1$ at volume $V_1$ and temperature $T_1$. Several possibilities due to heating the gas by the wall exist.

(1) If the gas heated by $+T_{diff}$ only during induction, then the pressure volume relation will remain the same. That is, since the gas is only heated by the walls during induction and not during compression, by assumption, the compression will be adiabatic and therefore will arrive at the same state $V_1$, $P_1$, but at a higher temperature $T=(T_{diff}+T_o)/T_o \times T_1$. The excess heat will be later rejected, therefore requiring more work to deliver the same mass of gas.

(2) Heat can be added after the start of compression and the gas will follow the curve 2, steeper than the pure adiabatic one. The gas temperature is then likely to exceed the wall temperature, transferring heat from the gas back to the wall and the curve will bend over, curve 3, less steep than the adiabatic curve 1. The work required will be greater. Curve 4 is more realistic in that wall cooling of the compressed gas at the end of the cycle may actually reduce the final gas temperature, $T_4$ at $V_4$, below $T_1$ at $V_1$ of the adiabatic case, but the net work still exceeds the adiabatic case.

(3) The wall can be cooled perfectly and retained at the temperature $T_o$, the gas can exchange heat with the wall perfectly and then the compression is isothermal along curve 5. This is the minimum work cycle to obtain cold gas at the final temperature $T_5 = T_o$. It usually cannot be achieved in practice, again because (1) the skin depth argument that isolates the interior from the exterior on a transient basis, and (2) turbulent heat exchange is only partially effective in a normal cylinder and piston.

SUMMARY OF HEAT LOSS AND ADIABATIC CYCLE

The heat exchange occurs because of turbulent flow in the induction gas. The maximum gas mass or minimum temperature $T_o$ is maintained during induction only if either the walls are retained at temperature $T_o$ or induction is near-laminar flow. During compression the same argument applies. However the thermal skin depth argument says that if the wall is thick compared to the skin depth, it will average the heat flow on the outside, but inside it will alternately be hot and then cold in a thin layer. If the gas is turbulent, this alternately hot and cold heat reservoir will cause heating of the induction air at the worst time, causing the compressed gas to reach a hotter temperature $T_3$ that in turn heats the gas still further and requires still more work, and so forth, until the higher average temperature of the walls allows the heat to be carried away. This is an inefficient compressor. It is better to reduce the heat exchange between the gas and walls by decreasing the turbulence and having near-laminar flow induction as well as compression.

The transient heat exchange due to partial turbulence and thermal skin depth is deleterious to all positive displacement heat machinery. As a useful measure Taylor (1966) ascribes about 30% efficiency loss to heat loss in a gasoline engine and up to 50% heat loss in a diesel engine. In other words a gasoline engine could be 45% efficient instead of 30% and a diesel could be 70% rather than 35% to 40%. These are large potential gains and therefore warrant some degree of complexity to achieve them.

SUMMARY OF THE INVENTION

Laminar Heat Exchange

If the fluid exchanges heat with the wall in something like 10 diameters of motion, assuming the volume has corners, it means that the velocity of the incoming fluid cannot be very much greater than the velocity of the piston or other moving boundary of the confinement volume (e.g., rotating vane). Since these velocities in typical machinery are usually less than 1/10 of the speed of sound of the gas, it means that the differential pressures at the inlet ports can be no greater than roughly 1% of the gas pressure. This in turn means that the ports must be designed with [an] area about equal to that of the piston. Valves that open by the gas pressure, like reed valves, will necessarily cause a high enough velocity of the inlet gases to give rise to high turbulence levels and hence large heat exchange losses, but a sleeve type intake valve will serve well. The exhaust port, on the other hand, need not be so large, and indeed this can be a reed operated valve, because the gases leaving the cylinder do not create turbulence within the cylinder during the exit process. As a consequence it is possible to make, for example, a laminar-ported piston compressor but only with the relative complication of a sleeve type inlet valve that exposes a side wall area. This area should be almost equal to the full area of the head of the cylinder, but substantial reductions in heat loss are provided with smaller induction ports, say about one-half the cylinder head area.

Vane type machinery, on the other hand, can be designed such that the inlet port area is as large as the entire compression or expansion volume cross section, provided the vanes do not ride on the outside wall of the compression volume. Otherwise the port entrance would have to be somewhat restricted by the necessary webbing to support the vane as it goes by.

I therefore provide specially designed ported engines or compressors in which the inlets are roughly equal to the entire cross sectional area of the compression volume and special care is taken so that the inlet gases enter with about the same velocity as the moving boundary of the confinement volume. In this fashion the gas flow will be near-laminar within the confinement volume during compression and expansion, and the heat loss to the wall will be significantly reduced. In many heat engines this should allow an improvement in fuel efficiency of up to a factor of two.

LAMINAR AND TURBULENT FLOW

Turbulence is generated in fluid flow when two conditions are met: (1) the viscous dissipation of a kinetic energy of the average flow field is small, or equivalently the Reynolds number of the flow pattern is large; (2) the gradient of the velocity distribution is not a constant; that is, there exist finite higher derivatives than the first derivative of the velocity as a function of distance perpendicular to the mean flow. Therefore, a uniform shear in the flow is not sufficient to initiate turbulence.

In practical terms turbulence enhances the friction (and heat transfer) of fluid flow in contact with a rigid surface. As one progresses from a smooth surface into the fluid, the flow immediately adjacent to the wall is laminar because the dimension is so small that fluid friction caused by viscosity is greater than the turbulent friction. At a critical distance into the flow where the Reynolds number (measured perpendicular to the wall) is greater than 100, the flow becomes turbulent, first with small eddies because there is only room for small eddies and then progressively larger eddies as one progresses further into the fluid. The progression of eddy sizes as one proceeds away from the surface into the fluid is called the "logarithmic profile." As one proceeds further downstream, for instance along a wing of an airplane, the turbulent profile extends further into the fluid. This depth of penetration for a smooth surface is a small fraction, about 1/10th to 1/20th, of the downstream distance. Hence the flow travels a relatively long way before exciting turbulence throughout the fluid. This is because a smaller eddy close to the wall must excite larger eddies further into the fluid, and so on. On the other hand if the wall is very rough with perturbations or projections that are large, then the turbulence will be excited very rapidly and eddies of the order of the roughness or projection size will be formed immediately. An airplane wing is made smooth so that a ratio of lift to drag in the range of 10:1 to 20:1 is achieved, but if a spoiler (vertical projecting flap) is used, the turbulence created is large, and the lift to drag ratio falls to 2:1 or 3:1. On the other hand if the flow were perfectly laminar, a lift to drag ratio of greater than 100 would be possible. Hence on a relative scale the smooth wall with a weakly turbulent boundary layer acts as if it were "near-laminar" in drag characteristics, as opposed to extreme turbulence as would occur with a spoiler.

In the case of rotational flow in a cylinder, the flow is in contact with a smooth wall with no corners and hence it is near-laminar. An azimuthal vortex, on the other hand, will have the flow deflected by sharp corners and hence will be more turbulent. This is why the axial vortex is called "near-laminar" whereas the azimuthal vortex is fully turbulent. Finally, the shear in the velocity distribution as a function of radius within the axial vortex does not induce turbulence because the gradient of the velocity with radius is a constant (condition 2). Only the contact or friction with the wall induces turbulence. In this discussion of near-laminar flow along a smooth surface it is presupposed that the flow immediately upstream from that surface is itself near-laminar and of a velocity and direction not greatly different from the velocity along the surface in question.

GENERAL DESCRIPTION OF ADIABATIC POSITIVE DISPLACEMENT MACHINES

In accordance with the present invention, the efficiency of positive displacement machines (both piston-cylinder and vane compressors and expanders) is substantially improved by introducing the gas into the compression or expansion chamber through an inlet passage (or several inlet passages) that is shaped and sized to provide near-laminar flow of the gas into the chamber, thereby to reduce substantially heat flow to and from the walls of the chamber. In the case of piston-cylinder machines, near-laminar flow is attained by an inlet passage having an area of from about one-half of to about equal to the area of the piston, preferably a passage or passages that open at an inlet port that extends 360° around the cylinder and is opened and closed by a sleeve valve. The passage should be a plenum or two or more volutes that are arranged to introduce the gas into the cylinder with a substantial component of velocity tangential to the cylinder and thereby induce axial vortex flow and inhibit the formation of a radial vortex and consequent high turbulence and heat exchange. In the case of vane machines both the induction passage and the discharge passage have cross-sectional areas along their lengths such that near-laminar flow at a velocity substantially matching that of the rotor vanes is maintained therein, thereby to reduce heat flow between the gas and the rotor vanes and the casing walls of the machine. The casing walls of a vane machine are preferably made of a material having a low thermal conductivity to reduce heat flow within the walls and minimize the heat short circuit of the walls.

To ensure near laminar flow into the chamber, the chamber must be a "trapped volume," i.e., a volume that is not exposed to any gas at a pressure substantially different from that within it when the gas is conducted into it. If the chamber communicates (e.g., through an open exhaust valve) with a gas at a pressure different from that within it during induction, the pressure difference will induce turbulent flow in the gas being inducted, regardless of the size and shape of the induction passage and port. On the other hand, the chamber may communicate with another chamber as long as the other chamber is at substantially the same pressure and is otherwise closed, as exemplified by the two-stroke compound diesel embodiment of the invention described below, in which, for example, the combustion cylinder is open to the exhaust cylinder during induction into the combustion chamber, the exhaust chamber being otherwise closed and hence constituting together with the combustion chamber, a trapped volume.

The present invention includes, but is not limited to, the following machines:

FOUR-STROKE OTTO CYCLE ENGINE

The inlet passage extends 360° around the top of the cylinder as a plenum and is opened and closed by a sleeve valve operated by the engine crankshaft or an overhead camshaft. Fuel is introduced into the cylinder generally along the axis so that it is generally localized for combustion in a region spaced apart from the cylinder walls. The plenum has vanes oriented obliquely to the tangential to induce axial vortex flow in the chamber. The axial vortex flow promotes combustion by centrifuging droplets of unburned fuel outwardly from the axis where air undepleted of oxygen is available to support combustion of the fuel.

TWO-STROKE DIESEL ENGINE

This engine has a supercharging piston-cylinder, a combustion piston-cylinder, and an exhaust piston-cylinder having, respectively, compression ratios in the following ranges: supercharging—3:1 to 8:1; compression—3:1 to 4:1; exhaust—6:1 to 9:1. Air is inducted into the supercharging cylinder through a 360° inlet port, prefereably at the top, that is opened and closed by a sleeve valve and receives air from a plenum or volutes that induce a circumferential velocity component for formation of an axial vortex and near-laminar flow in the cylinder. The supercharged air is conducted to an insulated storage chamber which holds the air for subsequent quasi-static displacement and scavenging of the combustion cylinder. The volume of the storage chamber should be in the range of from about one to about six times the displacement volume of the combustion cylinder. The combustion cylinder has a 360° inlet port at the bottom of the piston stroke that receives supercharged air from the storage chamber from a volute that induces an axial vortex flow in the combustion cylinder. Preferably, at peak compression the radius and stroke of the combustion cylinder are roughly equal to provide a large clearance volume for minimizing heat loss. The head of the combustion cylinder is smooth, and the exhaust valve is substantially coaxial with the cylinder axis. Fuel is injected substantially along the axis of the combustion cylinder so that the axial vortex flow is substantially undisturbed and combustion is enhanced by the centrifuging of fuel droplets to regions where the air has not been depleted of oxygen. The exhaust valve opening from the combustion cylinder should be located generally midway between the axis and the wall of the cylinder, where it provides more complete scavenging. In the case of a coaxial tubular exhaust valve, the head of the combustion cylinder is cooled to provide a high heat transfer for cooling of the valve. The exhaust gas is conducted from the combustion cylinder to the exhaust cylinder through a thermally insulated, smooth-walled passage to a volute that induces an axial vortex, near-laminar flow in the exhaust cylinder. The exhaust valve of the exhaust cylinder is a sleeve valve, is located generally at half radius and has a width equal to about half the cylinder radius.

GAS COMPRESSOR

Air is inducted into the cylinder from a plenum having vanes oblique to the radial through a 360° induction port at the top of the cylinder that is opened and closed by a sleeve valve. The inducted air exchanges little heat with the cylinder walls due to the inducement of a near-laminar axial vortex flow.

ARTICULATED VANE COMPRESSOR OR EXPANDER

Both the induction and discharge passages leading to and from, respectively, the compression-expansion zone have cross-sectional areas such that near-laminar flow at a velocity substantially matching that of the rotor vanes is maintained in the passages. A highly efficient Brayton cycle heat pump utilizes appropriately sized articulated vane machines embodying the present invention. The housing and shaft coupling should be insulated to minimize the heat short circuit.

TURBULENCE FOR COMBUSTION

It should be recognized that in internal combustion engines turbulence is very often purposefully induced in order to "scavenge" the combustion gases and particularly in the case of a gasoline engine to induce more thorough mixing of the fuel-air mixture near the cold walls with hot burning gases in the interior to promote complete combustion. These requirements obviously conflict with near-laminar flow.

On the other hand the positive control of the gas motion in both diesel and Otto cycle engines offers the possibility of designing the fuel injection system for diesel and fuel-injected Otto cycle engines so that the cooled boundary layer in contact with the wall contains little fuel, i.e. is very lean. The combustion zone is then isolated from the cold outer cylinder wall and is exposed only to the hotter piston crown and head. The un-burnt fuel problem is then reduced.

COMPRESSION AND EXPANSION

There is also the additional conflict of the large difference between the mean temperature of the gases during compression and expansion. The temperature of the gases during compression is very much less than that during expansion because of combustion, so the heat loss from the hot gases during expansion tends to heat the walls to a higher mean temperature than would occur during compression. Thus the compression will be hotter than an adiabatic compression and hence require more energy than necessary. Some of this energy is recovered during expansion, but the net effect is inefficiency. It is for this reason that there is a distinct advantage from the standpoint of efficiency to separate compression machinery from the expansion machinery. This is done in gas turbines, but since the blades of the expansion turbine must come to an equilibrium temperature with the highest temperature gases after combustion, the stresses due to the required high velocity of the blades severely limits the peak temperature and hence limits the Carnot efficiency. One is thus limited with current machinery by either turbulent heat exchange of the gas with the walls, or by the limiting temperature of turbine blades.

HEAT PUMPS

There is a special advantage of near-laminar flow compressors and expanders in Brayton cycle heat pumps. There are three general types of heat pumps: (1) An isothermal cycle or Stirling cycle covered in my concurrently filed patent application referred to above. (2) A Rankine Cycle that uses a special refrigerant that is compressed as a gas, gives up its heat in a condenser and becomes a liquid. The liquid is expanded to a gas in a cold heat exchanger where heat is added. (3) A Brayton cycle in which a gas is adiabatically compressed, heat is extracted in a heat exchanger then the residual energy is extracted in a heat expansion engine and finally the heat is added to the exhaust gas in a second or cold exchanger. In a Rankine cycle the energy corresponding to the fluid expanding through the expansion orifice (pressure×volume of fluid) is wasted, but since the volume is small because of the relatively high density of fluid, this wasted energy is small. On the other hand the restriction of refrigerant properties requires that a relatively large compression ratio be used so that the temperature ratios are large enough to cover useful extremes encountered in average climates. When the compression cycle is included, say 80% efficient, the result is an average "coefficient of performance" (COP) of about 2 to 2.5; the ideal COP is $T_3/(T_3-T_2)$. Hence for a typical 30° C. temperature difference, and the absolute temperature of 300° K., the theoretical maximum COP should be 10, not the relatively poor value of 2.0. In order to approach this higher value requires that one use a more efficient compressor as well as avoid the limitations of refrigerants. If one uses a Brayton cycle, one must now add an expansion engine, and the efficiency of this expansion engine becomes crucial. In such a cycle the compressor does an amount of work $(T_3-T_2)\times$ (a unit heat mass of gas) and then an amount of heat that is extracted in a heat exchanger is this same value $(T_3-T_2)$. This unit heat mass of gas is reduced in volume from $Vol_3$ to $Vol_2$ in the ratio $Vol_2/Vol_3=T_2/T_3$. When the smaller $Vol_2$ is expanded back down to atmospheric pressure, i.e. the same pressure ratio, it will cool by nearly the same temperature difference $(T_3-T_2)$, but the volume will be smaller and hence the work done in the engine will be less than that done by the compressor by the ratio $Vol_2/Vol_3=T_2/T_3$. If this work is fed back to the compressor, the net work that must be supplied from the outside is $1-(T_2/T_3)=(T_3-T_2)/T_3$ or the inverse of the theoretical maximum COP. This COP of 10 implies that the expander is doing 90% of the work done by the compressor and therefore the circulating power is ten times the power being supplied from the outside, i.e. the make up power = 10%. Hence if both the compression engine and the expansion engine each wastes 5% of its energy, i.e. each is 95% efficient, then the outside source must supply this additional lost energy, which doubles the energy that must be supplied. Hence the COP will decrease from the theoretical maximum of 10 to 5, or a loss of efficiency of a factor of 2 simply because each engine is only 95% efficient rather than 100% efficient.

Thus we can see how sensitive heat pump machinery is to the efficiency of the compression and expansion engines. Hence there is a major motivation for Brayton cycle pump machinery to be made as highly efficient as possible.

A ten percent loss in an internal combustion engine is not as serious, but then the temperature differences are much greater so that the loss of efficiency for a given turbulent heat exchange rate is significantly larger. As a consequence the efficiency loss is large enough to be significant.

SUMMARY

I therefore provide positive displacement machinery—compressors, expansion engines, internal combustion engines and heat pumps—in which the gases are introduced into the positive displacement volume in such a fashion to be near-laminar, that is, with residual circulation or eddy velocities that are smaller than or comparable to the positive displacement velocity of the moving chamber boundaries.

DESCRIPTION OF EXEMPLARY EMBODIMENTS

Articulated Vane Compressor-Expander

Figure 3:
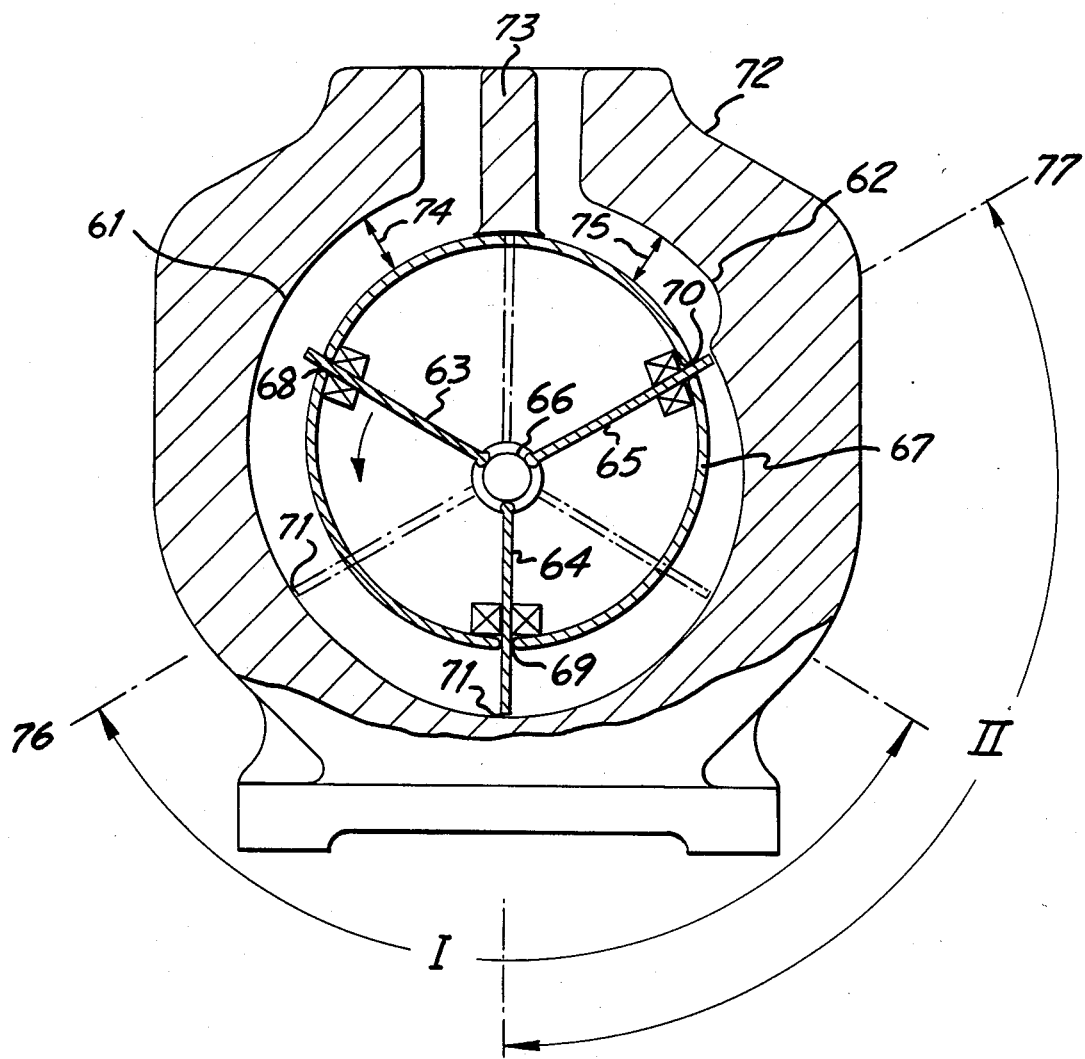
FIG. 3 is an end cross-sectional view of an articulated vane compressor-expander.

One embodiment of the present invention is the articulated vane air pump or expansion engine shown in FIG. 3. Articulated vane air pumps are used extensively in conjunction with automobile gas engines in order to add compressed air to the exhaust stream and reduce unburned gases. There is a particular advantage for using these articulated vane compressors or expanders (AVC) for heat pumps because of the very low friction of the moving parts—the vanes ride on central shaft bearings as opposed to riding upon an outside race where the friction is much larger. A considerable patent literature exists for articulated vane pumps, such as for automobile emission control, but this prior art is not directed to the efficiency of adiabatic compression. Selected citations to the principal technology are listed at the end of this specification.

Inside a housing 72 with inlet and outlet chamber 61 and 62, a set of vanes 63, 64, 65, are rotated about a stationary axle 66 by a rotating drum 67. The vanes slide radially through seals 68, 69, 70, in the drum and are sealed by clearances 71 with a concentric housing 72 in the compression region and by the web 73 that separates the inlet chamber 61 from the outlet chamber 62. The clearance 71 between vanes and compression housing 72 and between drum 67 and web 73 must be kept small in order to prevent leakage of gases, yet still prevent contact since the surfaces are not lubricated, but instead remain bare to prevent friction. In the usual forms of state-of-the-art AVC's the inlet and outlet chambers are of relatively arbitrary configuration. In this circumstance of a relatively large chamber, the air flow in and out is relatively stationary, compared to the movement of the vanes 63, 64, 65. Hence large turbulent eddies will be generated by the vanes. In the inlet chamber these eddies will be captured and the circulation in the compression chamber will cause increased heat exchange with the wall. In the delivery chamber the corresponding eddies will just cause waste heat and energy. In this embodiment, and according to the invention, the inlet and outlet chambers are shaped and dimensioned (dimensions 74 and 75) such that the flow velocity of the gas just matches the rotation rate of the drum 67. This dimension 74 for the inlet 61 is equal to the mean vane extension in the compression volume so that a given rotation of drum 67 and the vanes will displace gas in the chamber 61 at the same velocity as the drum 67. In the outlet chamber 62, the width 75 is just that of the inlet dimension 74 divided by the compression ratio, 1.336:1 in this case of a three-bladed pump as described next.

The rotor vanes 63, 64, 65, are shown when the compression volume behind vane 65 is just being released to the outlet 62 when the clearance 71 opens. The three vane design has an angle of 120° between the vanes. A design with two, four, five, etc., equally spaced vanes can easily be made. The number of blades determines the compression ratio, which is simply the volume ratio trapped between the blades from position I where compression begins to the compressed position II 60 degrees later. The resulting compression ratio for three blades is a near optimum value for heat pumps because the compression ratio is 1.366:1 and temperature ratio is 1.123:1, or $T_{diff}=37°$ C. and the ideal COP=8:1. If the compressor and expander are 95% efficient then the practical COP will be 4.

Figure 4:
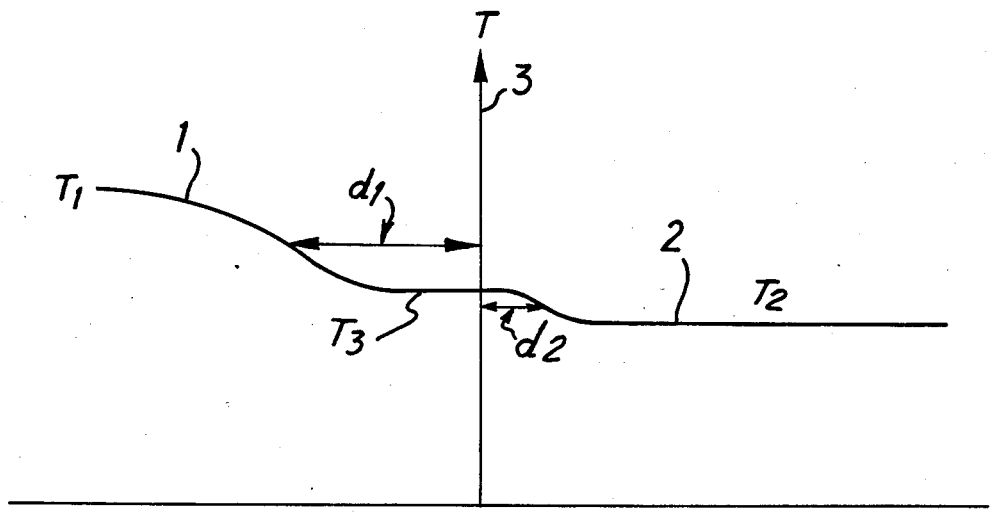
FIG. 4 is a diagram depicting the temperature drop in the gas in the machine of FIG. 3.

In the angular distance of 60 degrees from I to II the gas is compressed to the pressure at which it will be released. The blade position 76, indicated by the phantom lines, corresponds to when the inlet volume is just being closed. The gas in contact with each blade at position 76 is ultimately moved to position 77 in contact with the outer wall. In the process it is heated by compression (cooled if the flow is reversed for expansion) and hence will heat the wall. However, in the ideal case the gas and the wall will come to the same temperature for each position corresponding to the compression as the gas is swept from I to II. Hence if there is no heat conduction in the outer wall material, then heat transfer will be minimal. In this case it is, according to this invention, desirable that the outer wall be made of low enough conductivity material, such as stainless steel or a plastic-coated metal, and be thin to reduce this heat conduction backwards in the wall of the housing. The drum 67 and blades 63, 64, 65, however, rotate from hot region to cold region and hot etc. The heat transfer from and to the gas is the skin depth heat diffusion discussed earlier. By making the flow near-laminar, then the diffusivity of the gas is less, and the temperature drop occurs in the gas as depicted in FIG. 4.

Figure 1:
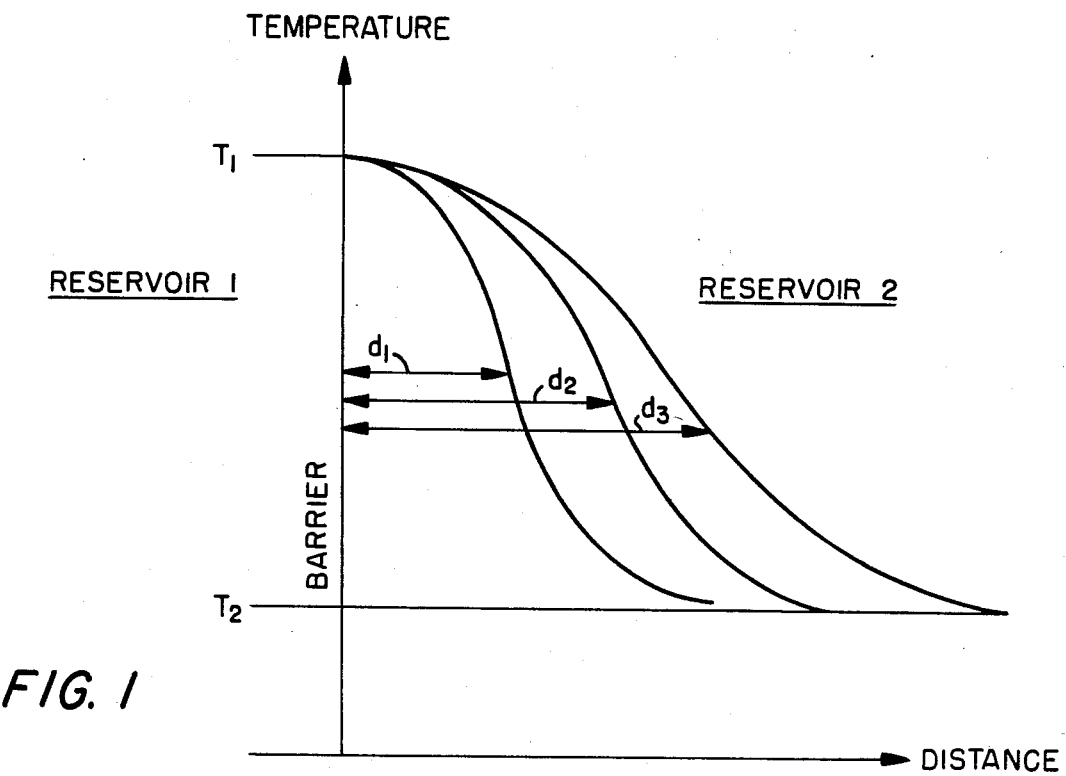
FIG. 1 is a diagram depicting heat transfer across a barrier.

Region 1 is hot at a temperature $T_1$ that is higher than temperature $T_2$. The mean wall temperature $T_3$ is the boundary temperature with $T_1$ greater than $T_3$ greater than $T_2$; and the temperature drop $(T_3-T_2)$ by diffusivity into the wall is shown with the skin depth $d_2$, which is small compared to the laminar gas where $(T_1-T_3)$ is large with the skin depth $d_1$. However, the density of the gas is very much less than that of the wall in the ratio of $3\times10^{-4}$ and so the heat mass is small and the heat lost or exchanged is small compared to the case in FIG. 1 where the gas was assumed turbulent and the heat flux to the boundary 3 was considered large.

Heat Pump

Figure 5:
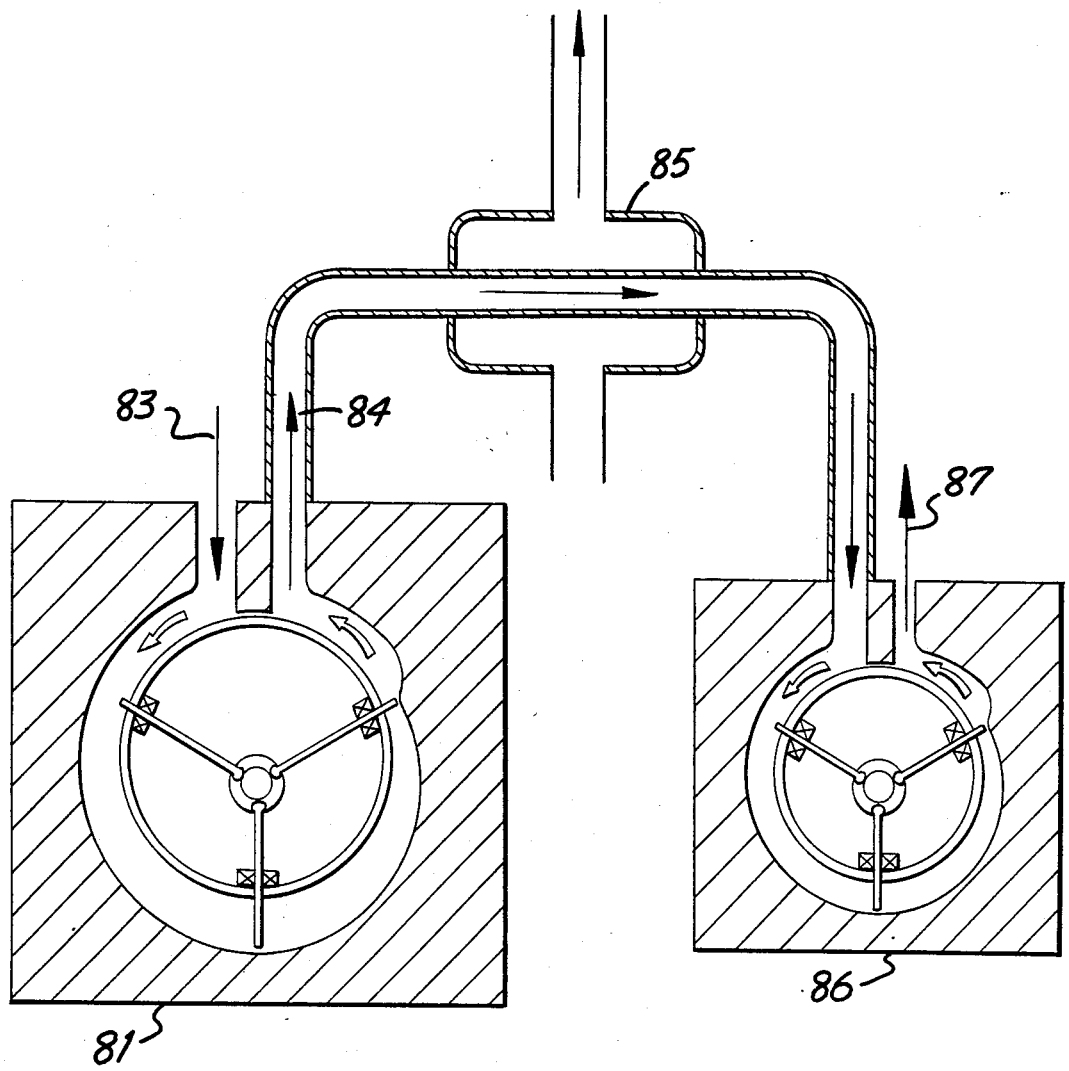
FIG. 5 is a schematic drawing of a Brayton cycle heat pump using the vane machines of FIG. 3.

FIG. 5 shows schematically a Brayton cycle refrigeration heat pump that utilizes the laminar flow AVC air pumps shown in FIG. 3. The compressor 81 compresses and heats air entering the intake 83 and discharges it at the outlet 84. The hot compressed air goes to a standard heat exchanger 85, is cooled and goes to an expander 86 that is built like the compressor 81, but smaller in volume flow by the ratio $(1-1/R_c)=75\%$. The actual dimension will be smaller by the cube root or 91% of the ideal compression size. We say ideal because part of the efficiency loss will be blow-by or leakage so that the actual volume flow ratio will be less than 75%. From the expansion engine 86 the now cold air from exit 87 goes directly to the space being cooled, e.g., an automobile interior, as cold air. The shaft coupling and the housing are suitably insulated to thermally isolate the compressor and expander and thereby minimize the heat short circuit between the compressor and expander.

Sleeve Valve Piston Air Compressor

It was pointed out earlier that the reduction of heat exchange between gas and walls was not usually very important for a standard air compressor because the heat of compression was usually rejected before use, even though this is inefficient. This assumes that the gas remains cooler at all times during compression than it would be for the case for a purely adiabatic compression. On the other hand as explained above and shown in FIG. 2, if the compressor cylinder walls and head are not cooled adequately, then the gas during compression may be hotter on the average than would be the adiabatic case and the work required for compressing a given volume of gas will be greater.

Figure 2:
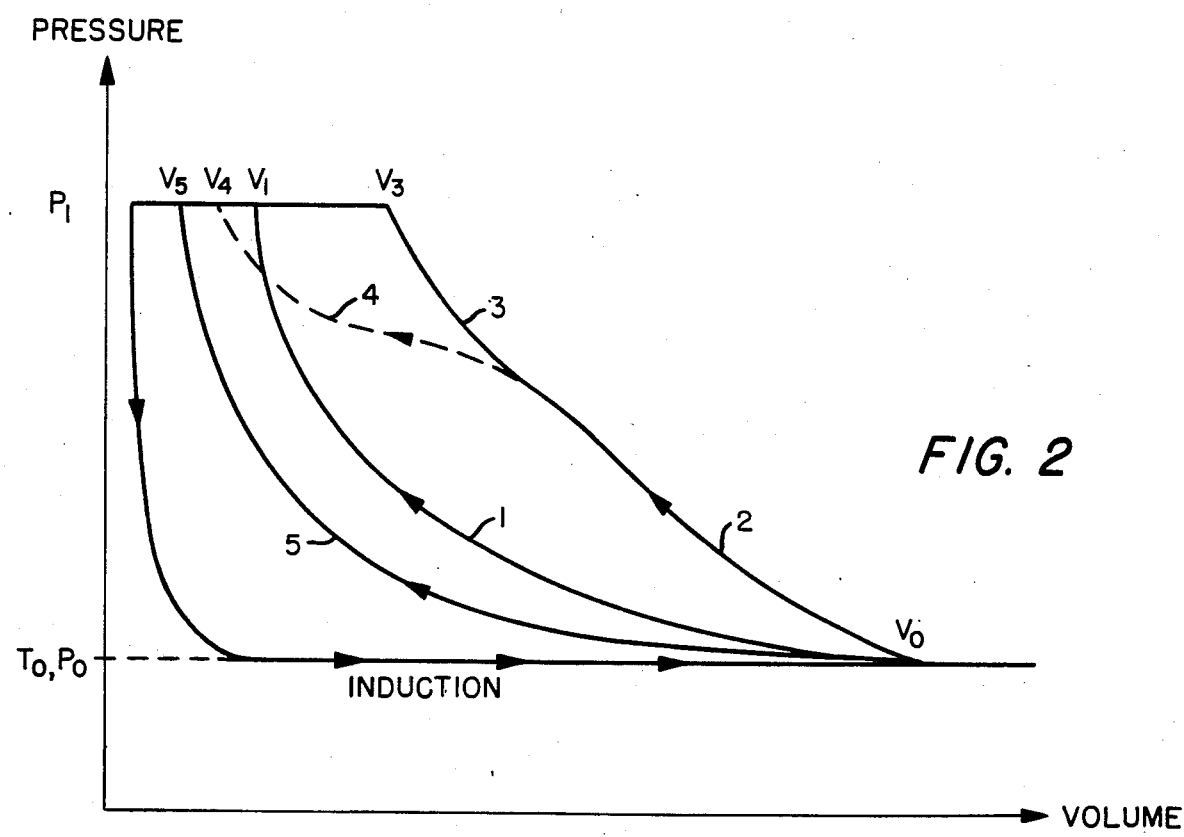
FIG. 2 is a PV diagram illustrating various thermal cycles.

If the cylinder walls and head are sufficiently cooled, it is possible to lower curve (2) to curve (5) of FIG. 2 sufficiently such that T and P are always less than the adiabatic case (1). This is similar to what happens with an intercooler between stages of an industrial air compressor. This requires additional compressor machinery and the same argument applies to each stage. Therefore, in general it is worthwhile to reduce heat exchange between the gas and the walls of any compressor unless the cylinders are especially effectively cooled. In FIG. 2 this corresponds to the isothermal compression of curve 5 that ends up at the original temperature $T_o$.

It is a purpose of this invention to reduce the heat exchange with the walls of piston compressors by inducing the inlet gas charge to enter in a near-laminar flow condition.

To achieve near-laminar flow in a piston compressor the area of the inlet ports is made nearly equal to the area of the piston and as symmetrical as possible with respect to the axis of the cylinder. One does not wish to induce eddies that circulate the gas rapidly from the walls to the inside volume and back to the walls again, etc.

Near-laminar flow in this context means that nowhere are the gas flow velocities within the cylinder significantly greater than the piston velocity. Therefore within one stroke the gas will not move very much further in contact with a wall than roughly a stroke length. If the walls are smooth, this means that the fractional heat exchange will be small. On the other hand the gases that leave through an exit valve can be at a considerably higher velocity than the piston and exchange heat with the exit "plumbing", provided this plumbing does not conduct through a thermally conducting metal path with too much heat transferred by conduction to the rest of the cylinder. The exhaust stream is all at the same constant temperature and so the exhaust plumbing can come to equilibrium. This means that the gases must enter the cylinder volume with near-laminar flow—i.e. slow velocity, but they can leave more rapidly and turbulently. Therefore the suction ports must be large—at least ½ the area of the piston—while the exhaust exit port can be smaller.

Figure 8A:
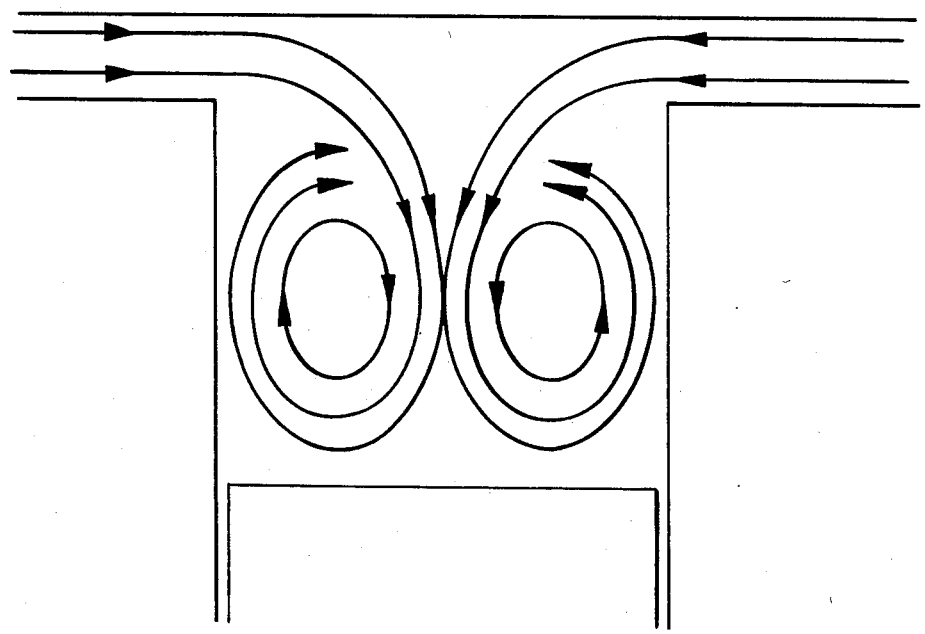
FIGS. 8A, 8B and 8C illustrate the annular vortex that forms and persists at bottom stroke, mid stroke and top stroke, respectively, when gas is inducted into a piston machine with little or no circumferential component of velocity—such would be the case with radial vanes like the ones shown in FIG. 7A.
Figure 8B:
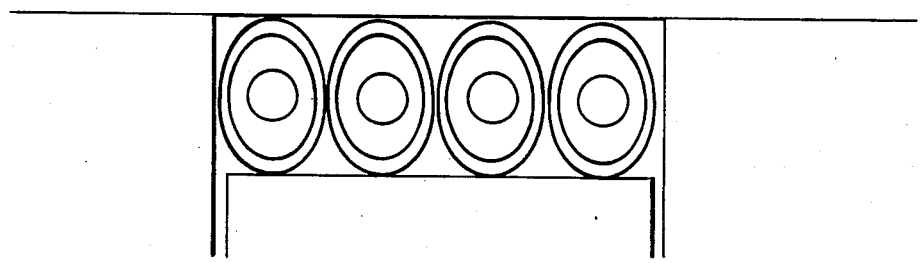
Figure 9A:
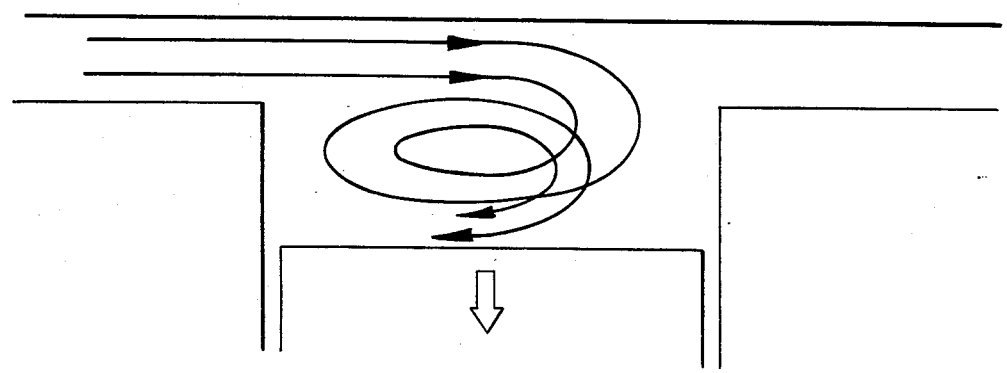
FIGS. 9A and 9B illustrate schematically the formation and expansion as induction progresses of an axial vortex flow as a cylinder expands—such a flow is induced by the oblique vanes shown in FIG. 7B.

In an air compressor that uses air operated reed or spring valves or equivalent for suction, it is almost impossible to obtain laminar flow because the air operated valve remains open only when there is continuously a significant fraction of an atmosphere pressure drop across the valve to overcome spring tension and inertia. Consequently when the inlet gas gets beyond the restriction of valve lip, it will expand and move into the cylinder volume at some significant fraction of sound speed—say ½ to ¼ of $C_s$. This in general is 20 to 100 times the maximum velocity of the piston and so ensures high turbulent heat transfer during the stroke. The way to avoid this high heat transfer is to induce the gas to enter the cylinder at the periphery of the cylinder walls through a large port area, as is shown in FIGS. 8a and 8b for the case of an air compressor with an inlet at top of stroke. The area of the port at the cylinder periphery is: port area = 2(pi) R L, where R = radius of cylinder, and L = length of port. The piston area = (pi)R$^2$. Therefore the port length necessary such that port area = (piston area) becomes L = R/2. Since the stroke is 2 R, i.e. stroke = diameter, then the inlet port length can be a small fraction (¼) of the stroke length and the piston rings need not overlap the port. The flow pattern for a straight-in, i.e. radially oriented flow, is shown in FIG. 9a.

Figure 6:
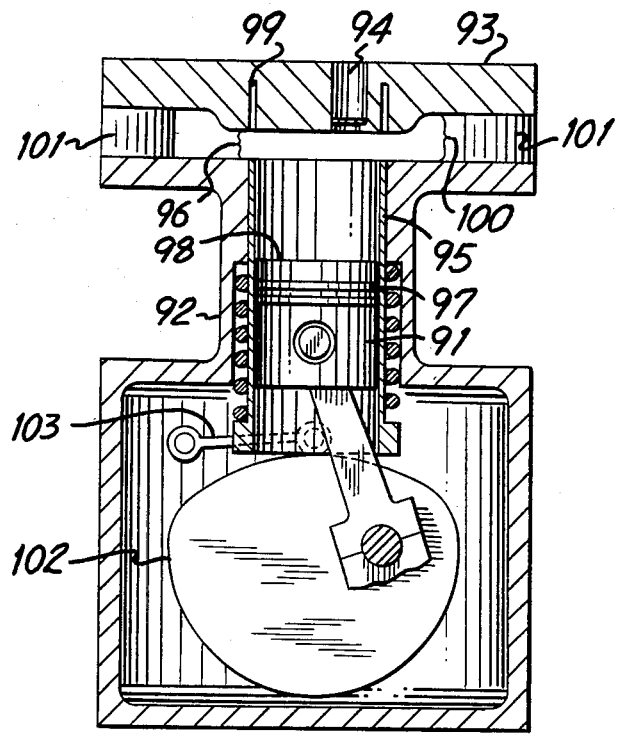
FIG. 6 is a side cross-sectional view of a compressor.
Figures 7A, 7B:
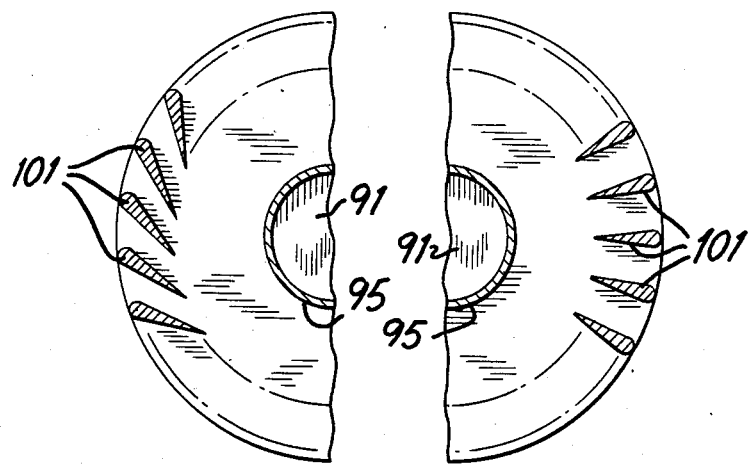
FIG. 7A is a top cross-sectional view through an induction passage showing radial vanes—such radial vanes may be used but are not preferred.
FIG. 7B is a top cross-sectional view through the induction passage in the compressor shown in FIG. 6—these vanes are oblique to the radial and induce the desired axial vortex flow that suppresses the formation of an annular vortex.

In the embodiment shown in FIGS. 6 and 7b a piston 91 rides inside a cylinder 92 with a standard head 93 and exhaust valve 94 that may be any of the standard types (reed, spring loaded, flapper, etc.). A sliding ring or sleeve inlet valve 95 opens and closes an inlet port 96 opening 360° around the cylinder and of a height of roughly half the radius of the piston.

One means of operating the sleeve valve 95 in proper phase with the piston is to have the sleeve valve 95 enter a small recess 99 in the head 93 for sealing the compressed gas from leakage back into the plenum 100. The plenum 100 carries the induction gas or air to the inlet valve 95. Vanes 101 at the entrance to the plenum 100 direct the induction gas to the inlet port 96. The valve is opened and closed by a cam 102, and a rocker arm 103 causes a small rotation of the sleeve valve 95. Ricardo (1954) has shown the effective operation of sleeve valves in gasoline and diesel engines. Thousands of British aircraft engines were manufactured in World War II with sleeve valves. These valves opened both suction and exhaust passages by rotation as well as axial motion, and the mechanical technology of sleeve valves for piston machines exists. The opposed porting of induction and exhaust did not, however, allow near-laminar flow and introduced about as much turbulence as the overhead valve, but valve operation was highly reliable. The small rotation at top and bottom of the stroke reduced friction by eliminating stiction.

If the vanes 101 that guide the entrance of the gas into the plenum 100 and the cylinder 92 were radially oriented as shown in FIG. 7A, then inflowing gas will tend to form an annular vortex just like a large smoke ring (see FIG. 8A). If the inlet port area is equal to the piston area, as recommended, then the velocity of this vortex ring will be roughly that of the piston.

Figure 8C:
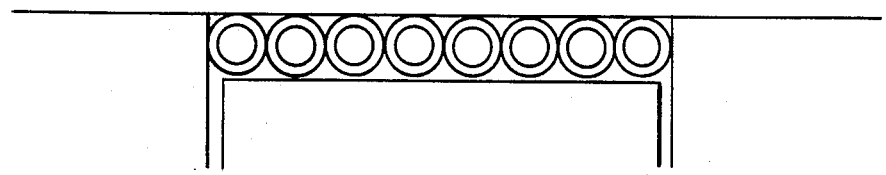

Simplistically we might think that the vortex would make roughly 1 turn during each half stroke or 2 full turns during both induction and compression. Since gas at high Reynold's number must move roughly 50 to 100 diameters to exchange its heat with a wall, we might believe that 4 turns might be adequately few. Unfortunately it is not this simple. A vortex is like a weight on the end of a string that contracts or a figure skater contracting his arms in a spin. As the vortex is compressed in the compression stroke, it will spin faster, provided the friction with the wall is small enough. The friction with the wall must be made small if the heat transfer is to be small; the two go together. In the case of the radial or smoke ring vortex, the velocity will increase as it is compressed. Conservation of angular momentum as the vortex is compressed one-dimentionally would increase its velocity as:

$$v_{vortex} = v_0(S_o/S_{min})^{\frac{1}{2}}$$

where $S_{min}$ is the compressed stroke length and $S_o$ the maximum stroke length. Hence if the compression ratio, $S_o/S_{min}$, is large, the velocity of the vortex will increase significantly. Actually if the compression ratio is large such that $S_{min}$ less than R, then the single vortex will break up into smaller vortices as shown in FIGS. 8B and 8C. FIG. 8A shows the single large annular vortex at bottom stroke; in 8B it is partially compressed; and in 8C it is fully compressed. The break up of the single vortex of FIG. 8A is shown as four vortex rings in FIG. 8B and as eight vortex rings in FIG. 8C. Let us suppose the compression ratio is 4:1 as it would be for an industrial air compressor supplying 100 PSI air. Then the vortex velocity would be increased by two times at maximum compression and the size (diameter) of each small vortex would be r/4 and so each one would make a revolution in ⅛ of a stroke period. The result would be nearly that of turbulence because the vortices would have time (number of turns) to break up. As a consequence a significant heat flow from vortices to wall (particularly the piston and cylinder heads) will take place. It should be further pointed out that if the inlet gas had been made turbulent from the start, i.e. the single large vortex had been made a larger number of smaller random vortices, then the turbulence as such will be compressed and increases in strength just as a 3-dimensional gas. (The radial vortex acts as a 2-dimensional gas.) Hence the turbulent velocity would increase as (Volume)$^{-\frac{1}{3}}$ or: energy is proportional to (Volume)$^{-\frac{2}{3}}$ just as would be the case for a gas with a G value (ratio of specific heats) of G = 5/3. The heat exchange with the walls of the cylinder and heads is greater because of this turbulent energy increases with compression.

It is an object of this invention to reduce both the turbulent as well as the single large radial vortex heat exchange in piston compressors and engines by means of both laminar flow and the induction of a weak axial vortex.

This discussion of the formation of an annular vortex, its compression, intensification, break-up, and dissipation has been theoretical and somewhat speculative, but there is now ample evidence from measurements using doppler laser tracking and finite element modeling to substantiate this description. The numerical modeling of Gosman, Johns, and Watkins (1978) shows all four of the above sequences with special emphasis on the scale and eddy viscosity. The finite element size truncates the calculation at a finite scale larger than the expected laminar boundary layer, but the resulting eddy viscosity gives vortex life-times in agreement with observation. The intensification of the primary annular vortex with compression and its break-up to isotropic turbulence is also predicted. The fact that the inlet flow dynamics is the entire source of the turbulence is also substantiated. It is particularly encouraging to observe how the experimental measurements of the in situ cylinder flow so perfectly matches the finite element calculations. Morse, Whitelaw, Yianneskis (1979) used doppler laser anemometry to map the flow patterns in motored piston-cylinder assemblies. These observed flow patterns of Morse et al. (1979, p. 215) are the complete confirmation of the theoretical ones of Gosman et al. (1978, p. 102). I therefore feel confident in predicting these flows analytically and, furthermore, defining the way to stabilize them. This is the axial vortex with near-laminar flow.

An Axial Vortex in Piston Machines

Figure 9B:
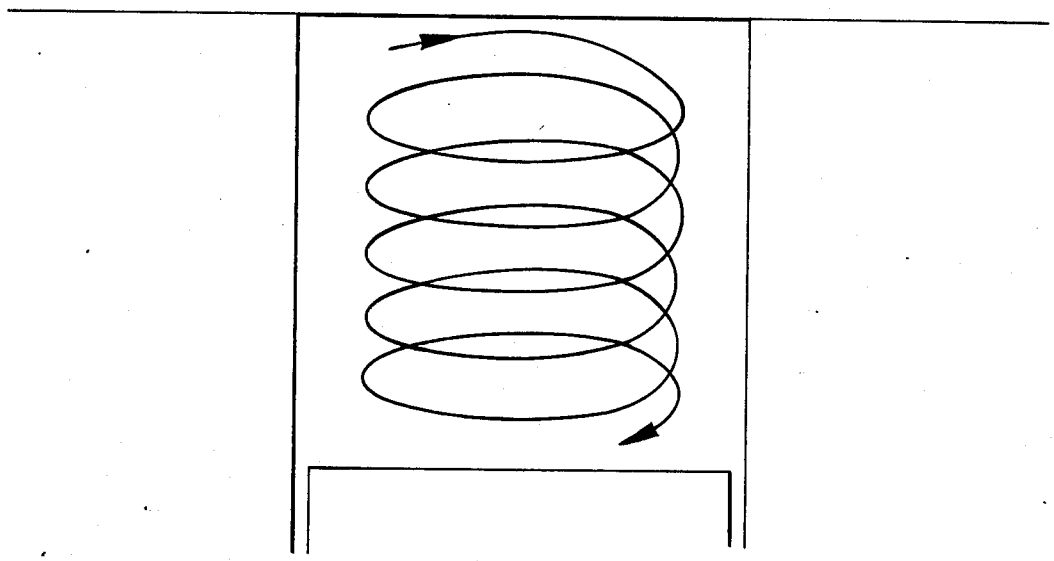

If, as shown in FIG. 7B, the vanes 101 of the plenum 100 leading to the inlet port are given an angle with respect to the radial of roughly 60° to 45°, then the entering gas or air will be given a velocity component tangential to the cylinder walls as well as radial and an axial vortex will be established. FIG. 9A shows a side view during inlet at half stroke and the rotational path given to the gas in the cylinder 2. FIG. 9B shows the piston at bottom of stroke and the rotational gas path. The axial vortex does not change velocity when it is compressed or expanded axially because its angular momentum is not changed. However when the gas that is injected at the radius is forced towards the axis by subsequent injected gas following, the classical vortex relations hold for a Rankine vortex and the vortex "spins up", i.e. rotates faster near the center than at the periphery. Conservation of angular momentum requires that the tangential velocity increases as $V_{tangential} = V_o(R_0/R)$ where $V_o$ is the tangential velocity at the outer cylinder wall of radius $R_o$ and R is some smaller radius. If we use our standard port area equal to the piston area and a vane angle of 45°, then the average tangential velocity $= 1.5\ V_{max}$ where $V_{max}$ is the maximum piston velocity. At a radius $R = R_o/2$ the rotational velocity is twice greater than the periphery velocity. This increase in velocity as the gas approaches the axis is a kind of centrifugal barrier. It is well known in the geostophic flows of the atmosphere, and is why vortices are recognized as such stable structures. The point is that a relatively weak axial vortex will prevent the annular smoke ring vortex from forming. The centrifugal barrier inhibits flows that interchange fluid elements in a radial direction. As the gas loses some angular momentum by some friction with the wall, it finds itself subject to less centripetal barrier (i.e. less angular momentum) and can therefore more easily approach the axis. However the radial motion towards the axis that forms the smoke ring vortex of FIG. 8A is prevented. Instead one has a higher rotation rate and velocities near the axis. There will of course be additional friction at the heads where the azimuthal velocity is greatest, but here the area is much smaller and so the total heat exchange is less. For example, at half radius, $R = R_o/2$, the tangential velocity is $3\ V_{max}$, yet the area is ¼ of the head area which in turn is 1/12 of the total area of cylinder walls and heads for a stroke length equal to a diameter or $S_o = 2\ R_0$. The region of high velocity of the axial vortex, then, makes only a small contact with the walls, and therefore there is a very much smaller heat loss than would occur either with high velocity isotropic homogenous turbulence, or with the induction of a large smoke ring vortex. It is therefore recommended that the laminar flow inlet valve incorporate a pitch to the vanes that gives the entering gas a rotational motion such as to form an axial vortex in order to reduce the heat loss both to the cylinder walls as well as to the head.

Detailed Design of Induction Axial Vortex Flow

We have shown that an annular or radial flow vortex in general adds to the convective transport of heat and therefore should be avoided. The primary purpose of the axial vortex is to suppress radial motion in the gas flow. Hence we desire that the gas entering the cylinder has as small a radial flow as possible, so we make the suction port opening as large as practicable to keep the absolute velocity small, regardless of whether it is radial or tangential, and in addition we desire that the flow through the suction port be at constant velocity both tangential and radial. If this were not the case—for instance, if we kept the radial flow velocity constant and allowed the tangential velocity to decrease—then the resulting axial gradient within the cylinder of angular velocity would induce an axial circulation and induce an annular vortex which is not desired.

The radial velocity is determined by (piston velocity)×(piston area/port area). The piston area is fixed. Then velocity=frequency×R sin $\theta$: (The projection of the crank arm slightly modifies the purely sine behavior); we want (piston velocity/port area)=constant, or port area proportional to sin $\theta$. This establishes the cam design that opens and closes the annular suction port, i.e. the suction port opening displacement should be approximately (DR) sin $\theta$, (DR=maximum suction portion opening). In order that the annular velocity be held constant during induction we have several choices.

1. The vanes that give the radial motion to the induction air can be arranged to give constant tangential velocity despite the changing port opening.

2. The induction air can be drawn from a plenum that has a secondary vortex within the plenum that lasts long enough so that the angular momentum of the induction gas remains constant during each induction period.

The second alternative is probably easier because the secondary vortex is easy to establish and has a long decay time relative to the piston cycle.

For an example of a conservative design: Let the tangential velocity be (pi)/2 times the radial induction velocity and let the radial induction velocity be the piston velocity. We assume a stroke of twice the radius. Then:

S=stroke=2 R $V_p$=piston velocity at mid-stroke, i.e. maximum velocity (neglecting the crank arm projection)

$t_s$=time of stroke=$(2R/V_p)(pi)/2=(pi)R/V_p$ $t_{cy}$=time of cycle (2 cycle)=$2(pi)R/V_p$ $V_R$=radial velocity of induction air assumed=$V_p$ $V_T$=tangential velocity of induction=$(pi)V_R/2$=$(pi)V_p/2$.

The time for induction air to make one revolution=$t_T=2(pi)R/V_T=4R/V_p$.

The number of revolutions of air during a cycle=$t_{cy}/t_T=[2(pi)R/V_p][4R/V_p]=(pi)/2$.

Therefore the expected damping or drag on the vortex as previously discussed should be $f_d$=#revolutions/50=3%. The fractional heat transfer should be roughly the same.

Let the plenum surrounding the suction port be R long and in the axial direction and 2R in radius. Then the tangential velocity:

$V_{plenum}$ at the plenum radius $2R_p$ becomes $$V_{plenum}=\tfrac{1}{2}V_T=[(pi)/4]V_p$$

and the time to make a revolution becomes $$t_{plenum}=2(pi)R_{plenum}/V_{plenum}=16R/V_p$$

and the number of revolutions in the plenum per stroke=

$$t_{cy}/t_{plenum}=(pi)/8.$$

This means the vortex will not decay significantly stroke to stroke since the vortex decay time with the vanes might be 5 to 10 revolutions.

The plenum will replenish a cylinder volume of $$S(pi)R^2=2(pi)R^3 \text{ per cycle}$$

and itself contains a volume $$R[4(pi)R^2]=4(pi)R^3.$$

Therefore half the plenum volume is replaced per cycle, and the vortex in the plenum will make (pi)/4 revolutions per filling time. This is also adequately small to ensure constant angular momentum or negligible decay of the plenum vortex. The input to the plenum vortex could be a single or several tangential ports of area sufficient to match the mean induction velocity. The plenum vortex averages the induction velocity. The mean induction velocity, i.e. average piston velocity, =$2V_p/(pi)$. The plenum tangential vortex velocity will be half of the cylinder induction tangential velocity, or $$V_{plenum}=V_T/2=[(pi)/4]V_p.$$

The plenum inlet port area is determined by the relation: (plenum port area)×(plenum tangential velocity)=(piston area)×(mean piston velocity); or plenum port area=$(pi)R^2V_p/V_{plenum}=[8/(pi)]R^2$.

Since the plenum is $R^2$ in cross section, this means that several ports would be required. A possibly reasonable design would be four tangential ports of R/(pi) in width and R long.

An experiment has been performed in which a commercial air compressor was fitted with a clear plastic sleeve valve and clear plastic head so that the flow could be visualized with smoke. When the plenum inlet vanes were given the angle prescribed by the analysis given above, then movies of the gas motion show the expected vortex. If the vanes were oriented radially no axial vortex was formed and a greater degree of random motion—turbulence—was evident.

Operation of the Sleeve Valve Piston Compressor

On the intake stroke air is drawn into the cylinder through the oblique peripheral vanes 101 causing an axial circumferential flow vortex to be formed in the plenum 100 (see FIGS. 6 and 7B). When air from the vortex is drawn into the cylinder through the induction port 96, it forms a near-laminar axial vortex in the cylinder. The near-laminar flow and stability of this vortex flow reduces the heat transfer from the air to the cylinder walls during the rest of the cycle. The induction sleeve valve 95 begins to open just after top dead center and is fully open at half down stroke. It is during this down (induction) stroke that the near-laminar induction vortex is created in the cylinder 122. As the piston 91 approaches the bottom of the stroke, the sleeve valve 95 closes, thereby maintaining a constant induction velocity as the piston slows down.

At the bottom of the stroke the sleeve valve is closed, and compression starts as the piston 91 starts upward in the cylinder. Compression of the gas continues until the gas pressure exceeds the delivery pressure and the exhaust valve 94 opens until the piston reaches top dead center. Meanwhile the sleeve valve is starting down. The induction port 128 opens a few degrees after top dead center when the small residual gas in the top-of-stroke clearance has reexpanded to the induction pressure. During the further downward stroke, the induction gas is drawn through the sleeve valve induction port from the plenum with its vortex motion. This is now the start of a new cycle. The reduced turbulence of the near-laminar flow and the stability of the axial vortex combine to create a greatly reduced heat transfer to the cylinder walls and head and piston crown.

Internal Combustion Engine

Typical classical text books on internal combustion engines, like "The Internal Combustion Engine in Theory and Practice" by Charles F. Taylor (1966) or "The Highspeed Internal Combustion Engine" by Sir Harry R. Ricardo (1953), make no mention of the transient effect skin depth heat exchange discussed earlier in conjunction with thermal skin depth concepts. Instead running averages are taken for pertinent quantities and this major inefficiency factor is neglected. The observation that the gas temparature at the end of compression is close to the expected adiabatic temperature is sufficient to dismiss the topic, but as demonstrated in FIG. 2 and the ensuing discussion the heat or energy loss in compression can be severe yet still have the final pressure or temperature sometimes not much different from the ideal adiabatic case. As a consequence the origin of heat loss from the gas to the walls is treated in the turbulent flow limit. The presumption of turbulence is ad hoc. A necessary condition for turbulence is a large Reynold's number and indeed this condition is satisfied. However, the condition for turbulence to uniformly fill the cross section of the cylinder volume is not treated. If the inlet valve area is constructed such that the gas rushes in at a velocity great compared to the piston velocity, then indeed there is plenty of time for the high velocity gas to create isotropic near uniform turbulence within the cylinder volume, and indeed this is what usually happens. We have shown instead that the gas can be inducted in a smooth near-laminar fashion and can therefore greatly reduce the turbulence. Furthermore we can give the gas rotation about the axis, suppressing undesirable heat exchange vortices. On the other hand many textbooks and recent designs of internal combustion engines emphasize the advantage for more complete combustion by the induction of greater turbulence, especially by "squish". The notion is that the turbulence enhances the mixing of burning and unburnt gases, thereby promoting greater combustion. This is in conflict with our objective of decreasing the turbulence in order to reduce the heat transfer.

There are two kinds of positive displacement internal combustion engines. The Otto cycle involves mixing fuel with the air before induction, and so fuel near the cold walls requires turbulent mixing to carry it to the hotter, interior, burning region. The second type of internal combustion engine is the diesel, in which the fuel is injected as liquid droplets after the air is compressed to a high temperature. In this case the axial vortex has a peculiar advantage.

Solid or liquid particles of higher density tend to centrifuge outward in a gas vortex. The injection velocities of several-micron-size particles, typical of fuel injectors, after traveling a centimeter and slowing down, are comparable to the vortex velocities expected (several $\times 10^3$ cm second$^{-1}$) at radii of $R_o/2$ to $R_o/4$. Therefore if the diesel fuel injector is centered in the head and injects a typical radial fan of droplets, the axial vortex has the ideal property of transporting the drops radially outward until they vaporize and burn. By adjusting the droplet size distribution and injection angle, the droplets will automatically be transferred to regions where they will be most effectively burned. If they have not been burned in one radial zone, they they will tend to be centrifuged outward to regions of more air and less fuel which augments combustion. A further beneficial effect occurs by injecting the fuel near the axis of a vortex. The fuel burned near the axis of the vortex will be the hottest region because of the most complete use of oxygen. However, it is just this region that is shielded from the walls by the outer layers of the vortex. Finally it is the nature of a vortex to be stabilized by heat such that the hot region of flow remains stable on the inside. (The hot air is lighter and "floats" to the axis. In the centrifugal force field of a rotating vortex the axis is the gravitational "high" point.) This effect greatly reduces the wall area in contact with the hottest gases and consequently reduces the heat flow from the combustion gases to the walls. Therefore it is an object of this invention to greatly reduce the heat flow between the gases and the walls both during compression and combustion for both the Otto and diesel cycle engines. In the diesel cycle engine it is a further objective to maintain combustion partially removed from the cylinder walls thereby further reducing the heat loss and emissions.

Heat Loss in a Carnot Cycle

The theoretical maximum efficiency of a compression engine from the second law of thermodynamics is just:

$$Eff = (T_2 - T_1)/T_2$$

where $T_1$ is the initial temperature of the gas and $T_2$ is the temperature of the gas after an ideal adiabatic compression. Since the temperature ratio $$T_2/T_1 = R_c^{(1-G)}$$

the ideal efficiency is just $$1 - R_c^{(1-G)}$$

where $R_c$ is the compression ratio and G is the ratio of specific heats, $G = 1.4$. Thus the typical Otto cycle engine with 8:1 compression ratio should give 56% efficiency and a diesel with twice the compression ratio of 16:1 should give 67% efficiency. In practice the efficiency may be $\frac{1}{2}$ of these values. It is well recognized (Taylor, 1968) that heat loss to the walls is a major loss, about 30%, and the remaining loss is ascribed to (1) "time" loss (15%) which is the delay in burning of the fuel relative to the time of maximum compression and (2) friction of the moving parts (5%). The skin depth loss discussed in this disclosure is not mentioned in engine literature. The time dependent heating of the walls when averaged indeed gives the heat loss that is measured in the cooling water (or air). However, the skin depth phenomenon also gives rise to an increase in the temperature of the exhaust gases over and above what they would be for an ideal cycle. Let us illustrate how that can happen.

Exhaust Heat Loss

In general experimental engine measurements do not compare exhaust gas temperature to the expected value because of the unknown heat exchange in the exhaust gas ducts. We consider the effect on exhaust gas temperature of an ideal pessimistic skin depth loss cycle. Ambient air enters at temperature $T_1$ and is adiabatically compressed to $T_2$. Heat is added by burning fuel to reach a temperature $T_3$ and the hot gas is adiabatically expanded to $T_4$. The pressure, volume, compression ratio, temperature and specific heat relationships are expressed thus:

$$Vol_1 Vol_2 = R_c$$

$$T_2/T_1 = R_c^{(1-G)}$$

$$P_2/P_1 = R_c^G$$

The heat added by burning fuel, H, leads to a temperature $T_3$ such that $$H = T_3 - T_2$$

and the peak pressure is:

$$P_3 = P_2(T_3/T_2).$$

The expansion ratio is usually the compression ratio $R_c$ (without an exhaust turbine) and so the exhaust gas temperature $T_4$ is related to the peak temperature $T_3$ as:

$$T_3/T_4 = T_2/T_1 = R_c^{(G-1)}.$$

Skin Depth Loss

Let us suppose a fraction of 40% of the heat at $T_3$ is stored in the cylindrical piston wall at the time of burn. Then $T_3 = 0.6 T_3$ and the new values of P and T and P' and T", become:

$$P_3' = (0.6T_3/T_2)P_2$$

and the exhaust temperature becomes $$T_4' = 0.6T_3 R_c^{(1-G)}.$$

Let us suppose that of the 40% heat loss to the wall, ½ is returned to the inlet gas during induction and ½ is lost to the cooling water. In other words, the thermal skin depth thermal wave divided equally between in-going and out-going heat flow. We recognize that some of the heating of the inlet gas will take place after compression starts and give rise to the mechanical loss discussed previously but we suppose for simplicity that this is smaller than the initial heating before closure of the inlet valve and start of the compression stroke. Then the compression will start with the conditions $$T_1' = T_1 + 0.2T_3$$

$$P_1' = P_1$$

and the conditions after compression become $$T_2' = T_1' R_c^{(G-1)} = (T_1 + 0.2T_3) R_c^{(G-1)}.$$

The same amount of fuel is burned as before so that $$T_3' = T_2' + (T_3 - T_2)$$

and $$P_3' = P_2(T_3'/T_2').$$

Again a 40% loss takes place which is now more heat into the wall since $T_3'$ is greater than $T_3$. In each succeeding cycle $T_3''$ is greater than $T_3'$ is greater than $T_3$ etc. This sequence of increasing temperature must be limited by secondary effects.

Let us calculate typical values for a diesel engine with $R_c = 16$; $T_3 = 2T_2$; so that the heat added is $H = T_2$. This corresponds to a fuel mixture corresponding to 26% stochiametric. Then:

$$T_2 = T_1 R_c^{(G-1)} = 3T_1$$

$$T_1' + 0.2T_3 = T_1 + 0.4T_2 = 2.2T_1$$

so that $$T_2' = 2.2T_2$$

and $$T_3' = T_2' + T_2 = 3.2T_2 = 1.6T_3.$$

The exhaust temperature then becomes:

$$T_4' = 0.6T_3' R_c^{(1-G)} = 0.96T_4.$$

This is the expected value of the exhaust temperature without the 40% heat loss, but less work is performed. In other words the temperatures increase by a ratio of 1.6 per cycle and the peak pressure $$P_3' = (1.6/2.2)P_3 = 0.73P_3$$

decreases 0.73 per cycle. Hence more heat is lost and less useful work is done each cycle until another limiting effect takes place. One such effect is that $T_2$, the compressed input gas temperature, becomes greater than $0.6T_3$, i.e. the wall-cooled combustion gas temperature. In this case the heat loss during the compression stroke will limit the subsequent combustion gas heat loss because the wall will be already preheated. If $T_3$ then remains the same, let us say $1.6T_3$, and the heat loss to the skin depth changes to 20% of $T_3$ (another 20% is loss from $T_2$), then the exhaust gas $T_4$ will increase to $1.2T_4$ and 20% of the possible useful energy will be lost in the exhaust rather than through cooling water. Naturally these relationships are extremely complicated and a very detailed computational analysis needs to be made to give accurate predictions, but the above analysis is enough to give the direction of how to correct for these losses. The direction of these losses helps explain why the diesel engine can not be made more efficient by increasing the compression ratio further, say from 16 to 20. It is observed (Taylor, 1966) that the useful work or efficiency remains constant as a function of compression ratio in the range greater than 16. The reason for this is that as the compression ratio increases, the heat loss increases because the geometry of the clearance volume at the end of the stroke becomes thinner so that the surface to volume ratio becomes larger and so heat losses are larger.

Diesel Engine Design

We propose a geometry for a diesel engine that greatly reduces:
(1) thermal loss to the walls.
(2) time loss of compression ratio during combustion.
(3) mass of moving parts.

The geometry combines the concepts of near-laminar flow and separate supercharging, combustion, and expansion cylinders (2-cycle).

The overall compression ratio we choose is 20:1. The first supercharging cylinder has a volume ratio of 5:1. Therefore the combustion cylinder has a volume ratio of 4:1 so that the net compression ratio is 20:1. The first expansion in the combustion cylinder has the same volume ratio of 4:1. If the combustion leads to doubling of temperature and hence pressure, then the expansion cylinder must have a volume ratio of $$5 \times 2^{1/G} = 8.2:1$$

so that the exhaust pressure is reduced to the ambient atmospheric pressure.

The advantages are:

1. The supercharging cylinder and piston are subject to a lower pressure than the peak combustion pressure by the ratio of $1/(2 \times 4^G) = 1/14 = 7\%$. It can be made correspondingly lighter, with a shorter piston skirt, short stroke and larger diameter.

2. The combustion cylinder for equal length stroke will be smaller in diameter by $5^{-\frac{1}{2}} = 1/2.24 = 45\%$, or the piston area will be smaller by 1/5. Hence the maximum force on the piston and head will be smaller by the same ratio, i.e. 1/5, than a cylinder of a standard diesel of the same power and stroke. Therefore the mass and friction will be smaller by the same ratio.

3. The compression ratio of the combustion cylinder is only 4:1 and we assume a long stroke of 4r or two diameters. If the bottom port length is 0.5r (2-stroke), then the compression or expansion stroke is 3.5 radii long. This leads to a large crank angle of peak compression. For example, we consider combustion taking place over the range of compression ratios 16:1 to 20:1 to 16:1, or 67% to 70% to 67% ideal efficiency. Then this translates into a compression ratio in the combustion cylinder of 3.2 to 4 to 3.2. The total crank angle corresponding to these displacements is 54 degrees or about 1/6 of cycle. This is larger than the equivalent single cylinder 2-stroke diesel where for $R_c=16:1$ to 20:1 to 16:1 corresponds to 24 degrees or a factor of 2.25 shorter time. Therefore the combustion time compression loss is correspondingly reduced.

4. The combustion piston-cylinder geometry during peak compression and combustion period (16:1 to 20:1 to 16:1) is roughly 1 radius long. This is the mean head clearance during combustion for a 3.5 compression ratio for a stroke 3.5 radii long. Therefore the surface to volume ratio is favorable to reduce heat loss to the walls by a factor of $(1+r/z)=5$ fold compared to the standard single cylinder mean head clearance of 1/9 radius for a 20:1 compression ratio.

5. The expansion cylinder can be made larger than the supercharging cylinder so that the exhaust gases can be "over-expanded", actually correctly expanded, to extract all the useful work of the exhaust. So-called over-expansion of exhaust means that the exhaust gas is expanded down to atmospheric induction pressure. Normally the exhaust pressure is 2 to 2.5 times induction and the gas energy is either used inefficiently, 50% efficient in an exhaust turbine and supercharger, or wasted entirely. The separate exhaust cylinder allows for the correct over-expansion as well as the advantages of the smaller size and smaller compression ratio of the combustion cylinder.

6. Finally by careful port design we can reduce the usual large turbulent heat exchange with the walls by establishing the near-laminar flow axial vortex in each cylinder. This will require that the transfer of the gases from each volume be quasi-static and that, therefore, the pressure drop across valves be very small.

Separate Cylinders for Supercharging, Combustion, Exhaust

The primary reason for the three separate cylinder designs is to limit the compression ratio of the combustion cylinder to a small enough value such that the cylinder piston geometry during combustion is roughly a "right" cylinder, i.e. where the length equals the radius so that the near-laminar flow axial vortex can effectively reduce heat flow to the walls. The reduction of combustion time compression loss and reduction in mass are additional benefits. On the other hand two additional cylinders and complex valving must be added. The major useful work is recovered in the exhaust cylinder. This mechanical energy is larger than the combustion cylinder by the temperature ratios $(8.2)^{(G-1)}$ to $(3.5)^{(G-1)}$ or $2.32/1.65=1.41$ fold. Therefore the heat losses in the combustion cylinder are somewhat reduced in importance compared to the exhaust cylinder design. As a consequence we design the combustion cylinder with some compromise of laminar flow conditions.

Combustion Cylinder Design

The ideal laminar flow compression or expansion cylinder has been described above. The induction port is at the top of the cylinder wall, is r/2 long and allows slow laminar azimuthal and radial flow. This sliding wall valve would be difficult to seal and cool at the extreme temperatures, 1500° C., and pressures, 1800 PSI, of combustion. However, Ricardo (1953) has shown that a two-stroke slide valve diesel can be made to work well, but in the present case the induction air is much hotter (300° C.). In addition scavenging is strongly favored by an axial flow through the cylinder from bottom to top. We therefore propose that the combustion cylinder be made similar to a 2-stroke diesel where induction takes place with the supercharged gas (5:1 compression, 10:1 pressure) in the usual annular ports at the bottom of the stroke. These ports will be r/2 long, the same as the sleeve port allowing induction for 83 degrees. Exhaust leaves by an axially centered valve in the head.

Exhaust Cylinder Design

Since the exhaust gas pressure leaving the combustion cylinder is roughly twice the pressure of the induction air, part of the bottom stroke period must be used for letting down this higher pressure to the value of the supercharged inlet pressure. On the other hand the inlet gas must be transferred to the combustion cylinder and scavenge out the exhaust gases. We propose to accomplish this with near-laminar flow by arranging the inlet port and the exhaust port to be open at the same time. Therefore the pressures will all be equalized.

Since the volume is changing during this time as the exhaust piston descends, the induction air and exhaust gases will be expanding during transfer. The pressure starts at the exhaust pressure of the combustion stroke. Therefore the induction air must be over-compressed, above the mean supercharge value, when the induction port opens. The combined volume of gas of the combustion cylinder and supercharged storage volume will expand adiabatically as the exhaust piston descends and the exhaust gas will be replaced by a fresh charge of induction air that expands back down to the design supercharge value during induction.

We describe two methods for this let-down. The first will not work because the time is too short. Since this let-down must be an adiabatic expansion in the exhaust cylinder, the crank angle for the exhaust cylinder for a 2:1 pressure expansion of the exhaust becomes the let-down time. This let-down time is the time for the exhaust cylinder to move from top of stroke to a fractional volume$=(1/8.2)(\frac{1}{2})=0.0743$. for an exhaust piston stroke length the same as the combustion cylinder, this corresponds to a crank angle of arc cos $[1-2(0.0743)]=32$ degrees. The exhaust cylinder next must accept an equal volume of scavenge exhaust gases at constant pressure, i.e. the supercharge induction air pressure during an angle of arc cos $[1-4(0.0743)]=45$ degrees. The difference in timing between these two angles is 13 degrss. This is the time for the supercharged air to displace the exhaust out of the combustion cylinder. This time is too short and would require that the supercharging cylinder deliver all its charge at constant pressure in less than the required displacement time.

Supercharge Holding Volume

Instead, to avoid this problem, the supercharger can deliver its air at twice induction pressure to a holding volume. Then during exhaust let-down, the pressure drop of two-fold occurs in the combined volume of supercharge holding volume, combustion cylinder, and the initial stroke of the exhaust cylinder. At the same time a full charge of supercharged air is inducted into the combustion cylinder. The supercharger cylinder recharges the holding volume (adiabatically) back to its original pressure of ×2 induction pressure. The holding volume then becomes:

$$[1/(2^{1/G_1})] = 1.56 \times \text{Volume of combustion cylinder}.$$

Then induction will take place over a crank angle of the exhaust piston of $$\arccos[1 - 2(1.56/R_{c\text{-}exhaust})](\tfrac{1}{2})p^{1/G} = 40°$$

This time conveniently can be placed in the middle of the combustion cylinder induction port opening of 83 degrees so that the induction ports are almost fully open (88%) during let-down, induction, and scavenging. We next must consider the thickness for the inlet ports to the combustion cylinder in order to obtain low induction air velocity and hence low heat loss. We assume a fractional web thickness of the induction ports of 20% so that the effective induction area is:

$$[1-0.2][0.80][(pi)r^2] = 0.7(pi)r^2.$$

The mean density of the induction gas is about $[1-\tfrac{1}{2}(1-2^{-1/G})] = 0.8$ its final density and the effective area is almost 87% of the combustion piston area. The fractional induction time compared to a half stroke is $[2/(pi)][40/180]$ and so the induction radial velocity will be:

$$[2/(pi)][1/\text{effective area}][180/40] = 3.3 \times \text{piston velocity}.$$

We choose the azimuthal velocity of the axial vortex to be 1.5 times the radial induction velocities. This ratio is determined by the angle of the webs acting as vanes. In this case the gas makes:

(velocity × stroke time)/circumference = about 4 turns during compression and a like amount during expansion. The heat exchange should then be 10 to 15% provided the fuel is burned in the inner 25% mass fraction of the axial vortex (for 25% stochiametric burn).

Scavenging

The inlet supercharged induction air is centrifugally "heavy" relative to the combustion products. By this is meant that the induction air is cooler and has a higher angular momentum than the exhaust gas. It is cooler because it has not yet undergone combustion and it has a higher angular momentum because it has not had as long to spin-down in contact with the walls. Therefore it will tend to enter as a thin layer in contact with the outer cylinder wall, displacing and forcing the hotter exhaust gases towards a smaller radius and hence towards the exhaust valve at half radius. The inner $\tfrac{1}{8}$ mass of core of exhaust gases ($\tfrac{1}{4}$ in volume, $\tfrac{1}{2}$ in density) will tend to be weakly turbulent because of the momentum of the fuel spray. This favors interaction with the entering cooler induction gas and favors it being swept out of the exhaust valve. If this residue of exhaust gases proves to be too large, i.e. poor scavenging, then it is a simple matter to reduce the size of the exhaust valve to $\tfrac{1}{4}$ radius and only 5% of the exhaust mass would possibly be left behind. The axial vortex with a control exhaust valve therefore naturally lends itself to efficient scavenging. Ricardo (1954) had a problem with scavenging where he introduced "swirl", i.e. rotational angular momentum, in the inlet gases. This was because his exhaust port was also at the cylinder peripheral wall instead of near the axis. The inlet gas then forced the exhaust gases towards the axis away from the peripheral port and poor scavenging was the result.

Diesel Engine Design

Figure 11:
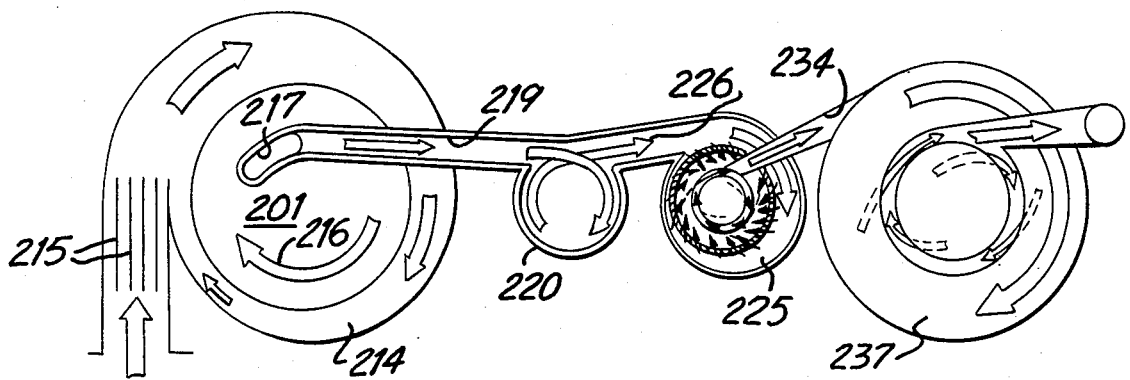
FIG. 11 is a top view in generally schematic form illustrating the path of gas flow through the engine shown in FIG. 10.
Figure 10:
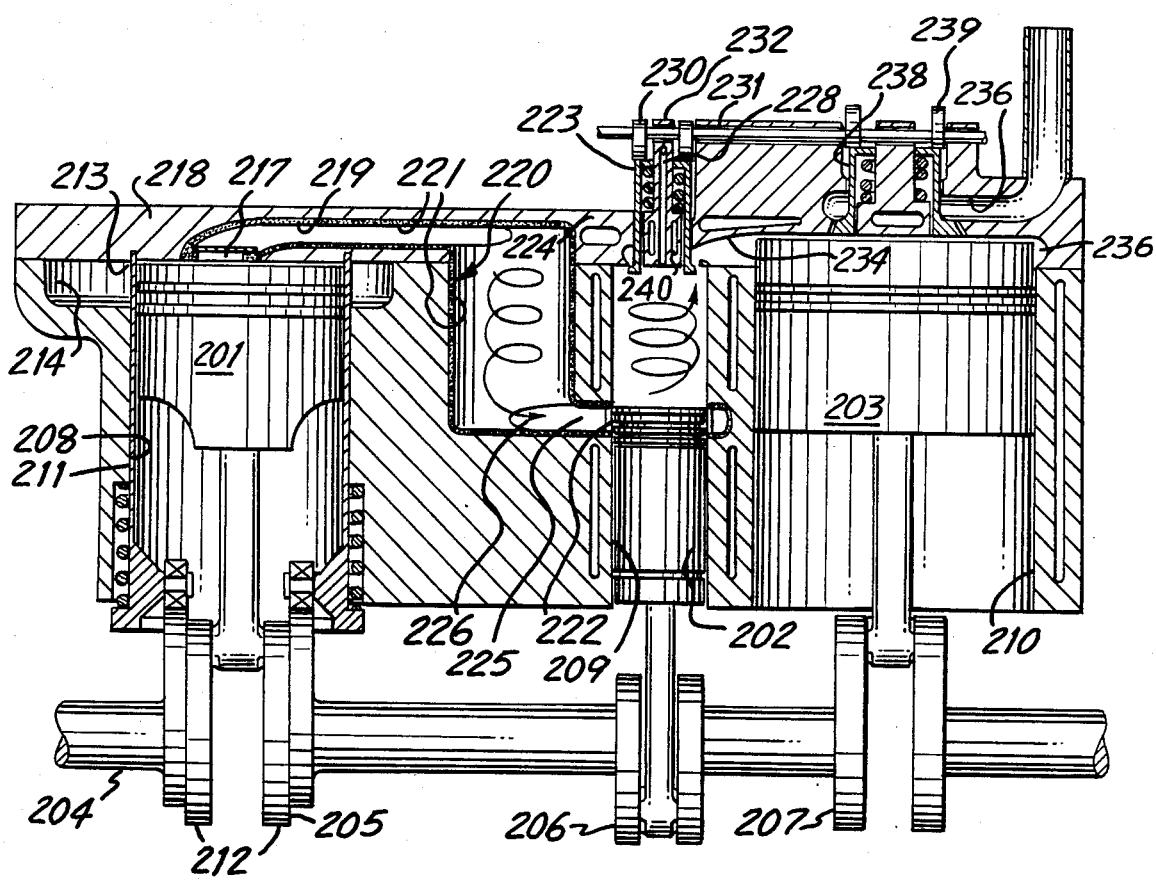
FIG. 10 is a cross-sectional view of a two-stroke diesel engine embodying the present invention.

In FIG. 10 three pistons—the supercharging 201, the combustion 202, and the exhaust 203—are driven by a crankshaft 204 and cranks 205, 206, 207, in respective cylinders 208, 209, 210. The supercharger cylinder 208 intake has a cylinder wall sleeve valve 211 driven by cams 212 on the crankshaft 204. These cams 212 drive the cylinder wall sleeve valve 211 so that it opens and closes an annular port 213 that allows induction air to be drawn from an annular plenum 214 with rotational circulation created by a volute inlet passage with straightening vanes 215. The rotation causes an induction axial vortex 216 (see FIG. 11) in the supercharging cylinder. The large induction port area 213 and axial vortex 216 result in small heat exchange with the cylinder wall 208 so that the supercharger air is compressed adiabatically and leaves the cylinder via the leaf spring exhaust valve 217 which is arranged semicircularly in the head 218 so that the axial vortex gases leave the cylinder at roughly one half radius and in the general direction of rotational flow. The supercharged air is compressed 8.2 fold to approximately 280 PSI and transferred in a duct 219 to chamber 220 that holds a volume of compressed (supercharged) air 1.56 times the volume of the combusion cylinder 209. The walls of the duct 219 and this chamber are insulated or ceramic lined 221 to reduce heat loss.

In operation the pressure of this supercharged air in cylinder 208 and storage volume 220 is the same as the pressure in the combustion cylinder 209 just before the exhaust release and is also the pressure in the exhaust cylinder 210 at the same time so that all three pressures are the same. The combustion piston 202 is just uncovering the bottom port 222 of the combustion cylinder 209 and the exhaust valve 223 in the combustion cylinder head 224. The gases are then transferred (FIG. 11) from the storage volume 220 to the compression chamber inlet plenum 225 via the transfer duct 226 at almost constant pressure and adiabatically and thus very small turbulence is induced. When the pressure has been reduced by a factor of 2 from 280 PSI to 140 PSI by the expansion of the exhaust piston 203 in the exhaust cylinder 210, the combustion cylinder is charged with fresh supercharged air and the exhaust valve 223 closes. The supercharged air is then trapped in the combusion cylinder 209 by the top rings of combustion piston 202 covering the inlet port 222. The inlet port 222 is a 360° opening to the cylinder having many vanes oriented about 60° to the radii of the cylinder so that the entering gas will make the preferred axial vortex. The supercharge gas pressure ratio is 5:1 which is the ratio of area of the supercharging cylinder 208 to combustion chamber cylinder 209. The further compression of the supercharged air in the combustion cylinder 209 is 4:1 before fuel injection so that the total compression ratio is 20:1. Fuel is injected into the combustion chamber by a fuel injector 228 of a standard type driven by a standard fuel pump (not shown) driven from the engine crankshaft 204.

When fuel is sprayed as fine droplets 227 (see FIG. 12) into the axial vortex 229 at the axis from the injector 228, the cone of droplets is confined to the axial region until they are radially centrifuged towards the cylinder walls. The flame combustion of the fuel remains in the region of the center of the vortex and only unburnt fuel droplets tend to escape radially to regions of pre-combustion with available oxygen. Hence the combustion progresses radially outward until the fuel is burned. The hot combustion products then remain separate from the cylinder wall 209 and only the piston 202 and head 223 are exposed to the hot gases over a limited area. It is a further object of this invention to utilize the near-laminar flow vortex to restrict the combustion to the central axial volume of the cylinder as well as to reduce the heat flow between the working gas and the walls.

Figures 12, 13:
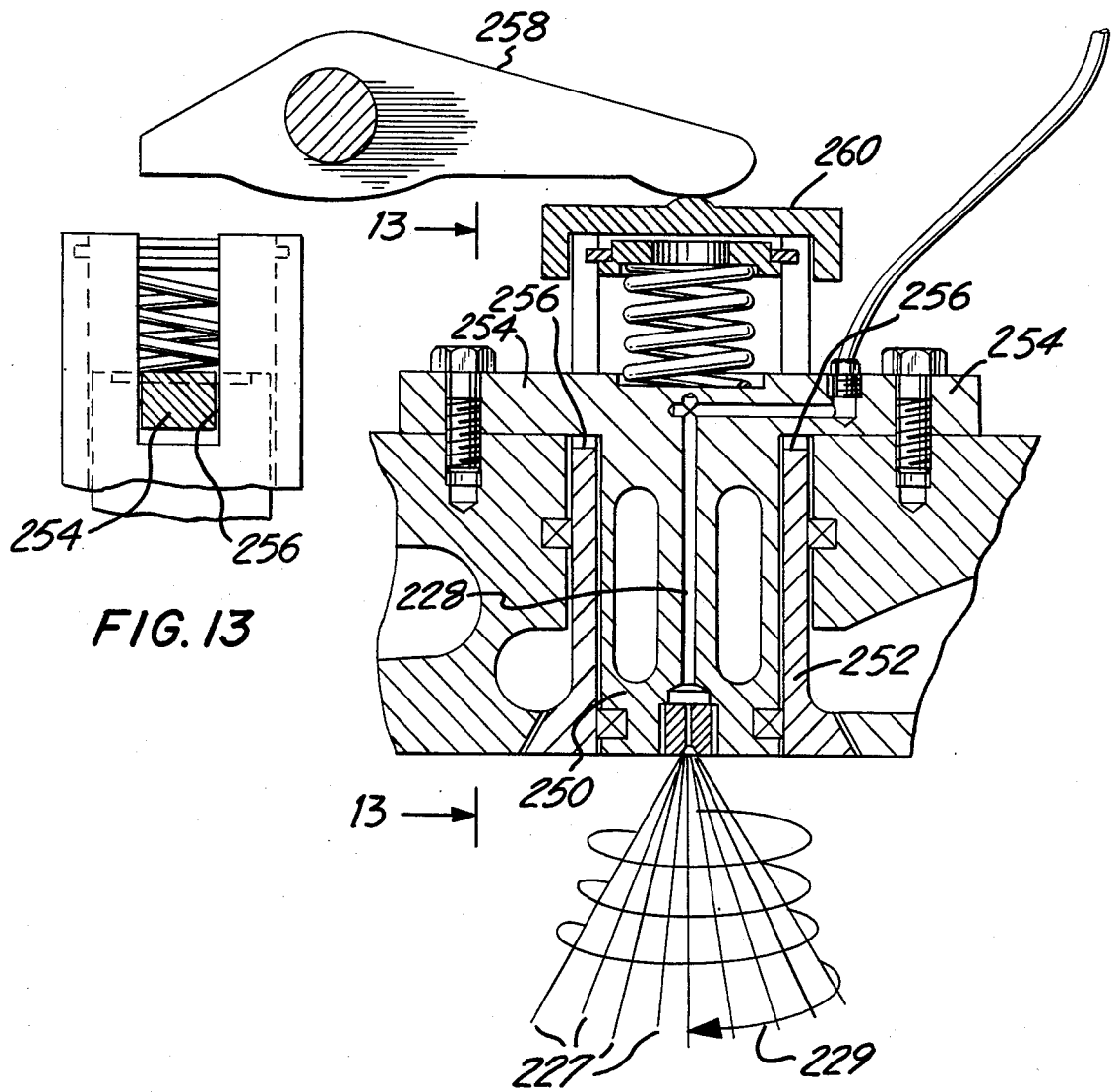
FIG. 12 is a fragmentary cross-sectional view of the head of a combustion cylinder that can be used in lieu of the head shown in FIG. 10.
FIG. 13 is a partial cross-sectional view taken along the lines 13—13 of FIG. 12 and in the direction of the arrows.

The tubular exhaust valve 223 is of a special cylindrical design shown in one form in FIG. 10 and another in FIG. 12. In FIG. 10 the valve is driven by an overhead cam 230 and shaft 231 and rides on the central cylindrical head portion 232 which is carried by the shaft 231 and is water-cooled in passages 233 so that the high exhaust gas temperature, 1100° C., does not overheat the valve. In addition the annular opening at half radius allows the axial gas vortex 227 to exit the chamber with minimum turbulence induced in the exhaust gas duct 234. The duct is lined with ceramic coating or other high temperature insulation to reduce heat conduction. The exhaust gas duct 234 is made short and of small volume, a few percent of the exhaust cylinder volume 210, so that the only valve between the combustion and exhaust cylinders is the exhaust gas valve 223.

The exhaust gases enter the exhaust cylinder 210 from the duct 234 through an induction port 236 at an angle to the radius of roughly 60° so that the axial vortex 237 is formed. The exhaust valve 223 closes when the exhaust piston 203 is 1/5 of its stroke after top dead center. This is when the exhaust gas is expanded in pressure from 280 PSI down to 140 PSI. The exhaust piston is then traveling at 2/5 of its maximum speed so that the induction port area 236 is designed to be 1/10 the piston area so that the entering gas is moving at 4 times the maximum piston velocity. Since around the azimuth to give a port area of 1/10 the piston area becomes $[(pi)/2]$ or $\frac{1}{4}$ turn.

The exhaust piston 203 then expands the exhaust gases by a total volume ratio of 8.2:1 which brings the pressure down to atmospheric pressure at the end of the stroke. An exhaust valve 238 is of the same design as the exhaust valve 224 of the combustion cylinder 209. It is opened by a cam 239 driven by the cam shaft 231, the same as the combusion cylinder exhaust port. The exhaust valve 238 stays open until the exhaust piston 203 is just before top dead center. The lead angle of the exhaust port is such that the trapped gases are compressed up to the value 280 PSI in the combustion cylinder 209 just before the inlet ports 222 and exhaust port 224 are opened. The exhaust gases leave via the volute 241 and the exhaust port 242.

As shown in FIG. 12 the head portion 250 of the combustion chamber—likewise the exhaust chamber—can be supported within the sleeve valve 252 by lugs 254 that extend out through slots 256 in the valve, and the valve can be operated by a rocker arm 258 through a tappet head 260 on the valve.

Figure 14:
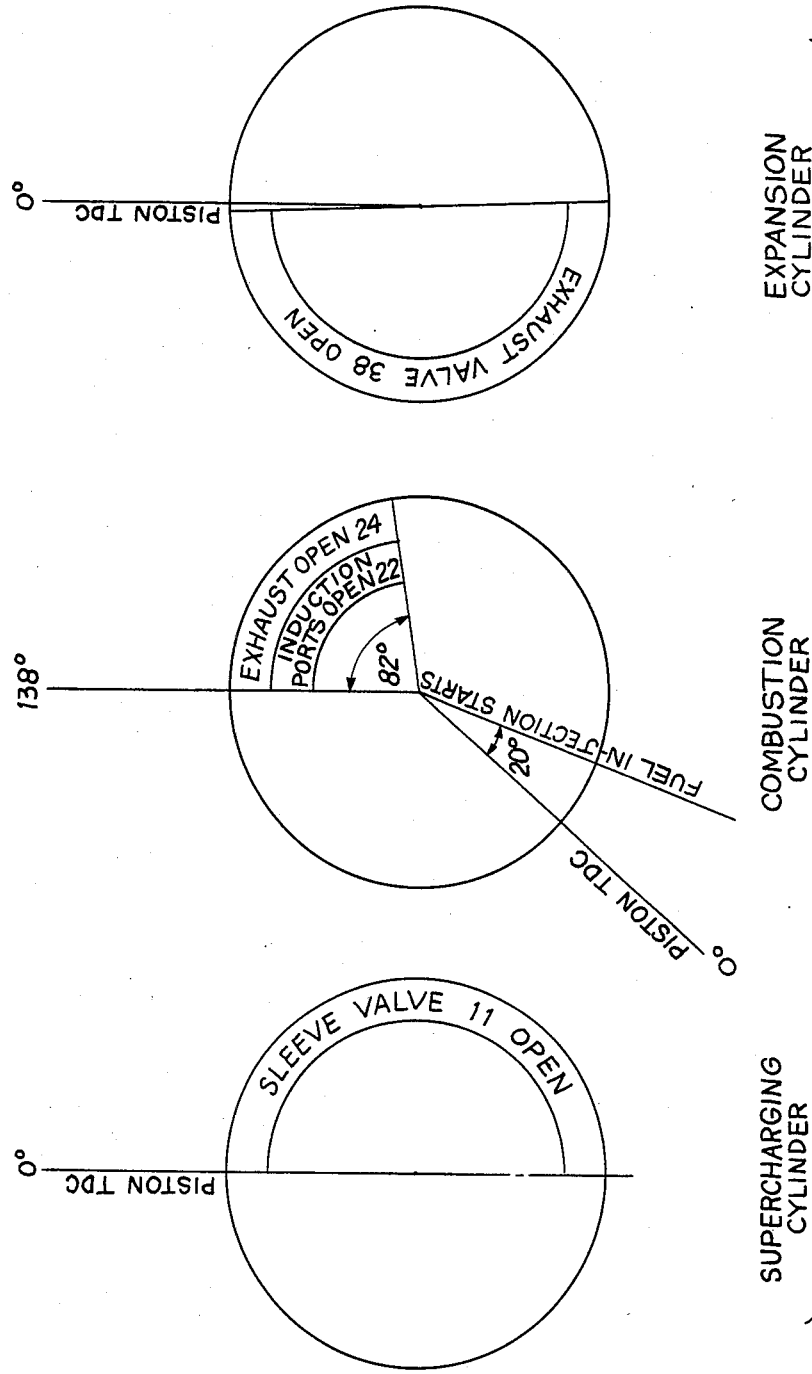
FIG. 14 is a diagram showing the timing of the engine shown in FIGS. 10 and 11.

The timing diagrams, FIG. 14, show the relative timing of the pistons and valves. Starting with top dead center of the supercharing piston 201, the induction sleeve valve 211 is 90° ahead and just about to open. The combusion piston 202 is at 138° just before the combustion exhaust valve 224 opens and the combustion piston 202 uncovers the induction bottom ports 222. The exhaust piston 203 is also at top dead center.

At a later time, 82°, the bottom combustion ports 222 close and at 180° the supercharging induction port 213 closes. Compression takes place in both supercharging and combustion cylinders 208 and 209. At about 20° before the top dead center of the combustion cylinder 202, fuel injection commences, starting the combustion processes followed by expansion.

Otto Cycle Engines

As previously discussed, an Otto cycle engine (i.e. gasoline and carburetor) usually is designed with maximum induced turbulence. When the piston crown or head is designed with a smaller diameter, re-entrant volume and then the clearance between the outer radius of the piston and head is made small, the gases are "squished" into the re-entrant volume. This is called squish because the gas in the small clearance volume is "squished" into the re-entrant volume thereby inducing turbulence at the end of the stroke. The objective of this turbulence as explained before is to ensure that the air fuel mixture, in contact with the walls, is continuously mixed with the hotter burning interior region so that combustion is more complete and less unburnt products result in causing pollution. However, the turbulence increases heat loss.

We have already discussed a diesel engine in which the fuel is introduced at the axis of the laminar vortex, thereby shielding the fuel from the walls and resulting in greater burn efficiency. In the diesel the fuel is injected late just as it is required for combustion. In the Otto cycle engine the fuel and air may be pre-mixed, in which case there will always be air-fuel mixture in contact with the walls, or conversely fuel-injected engines allow the possibility of a "stratified" charge. If the fuel is injected along the axis of the laminar vortex before the top of the stroke, then it will mix with air only out to a prescribed radius determined by the droplet size, vortex velocity and evaporation rate. The resulting stratification should then be enough to prevent the air-fuel mixture from reaching the outer walls. In this case there will be little or no air-fuel mixture in contact with the walls and no turbulence is required to give complete burning. Some "swirl" is sometimes induced by the shape of the head valves to create an axial vortex in Otto fuel injected engines, but the induction velocity is so high from restricted area ports and the non-uniformity so great that the resulting flow, although creating a vortex, nevertheless thoroughly mixes fuel and air out to the peripheral walls and turbulence is required to complete combustion. Instead, we suggest fuel injection into our near-laminar vortex and expect that very little fuel will reach the air in contact with the cold peripheral walls. Hence combustion will proceed with the fuel-rich inner core of the vortex. The air-fuel mixture in contact with the head and piston crown at the center of the vortex is in contact with surfaces that remain hot since they are not cooled by oil film sliding. We therefore consider the design of a laminar axial vortex fuel-injected Otto four-stroke engine where some heat conduction loss is expected, but because of the laminar axial vortex the heat loss is less and the combustion loss and hence pollutants from the wall are reduced.

The cycle is a standard 4-stroke, and compression and combustion occur in the same cylinder as compared to the above-described diesel design of 3 cylinders. The lower compression ratio (e.g. 8:1) of the Otto cycle partially circumvents this requirement.

A more efficient design can be made with a supercharger because the final compressed volume becomes more favorable (larger head clearance) and proportional to the supercharging ratio, but even without supercharging, the laminar axial vortex with combustion maintained clear of the peripheral walls will significantly reduce the heat loss.

Four Stroke Otto Engine

Figure 15:
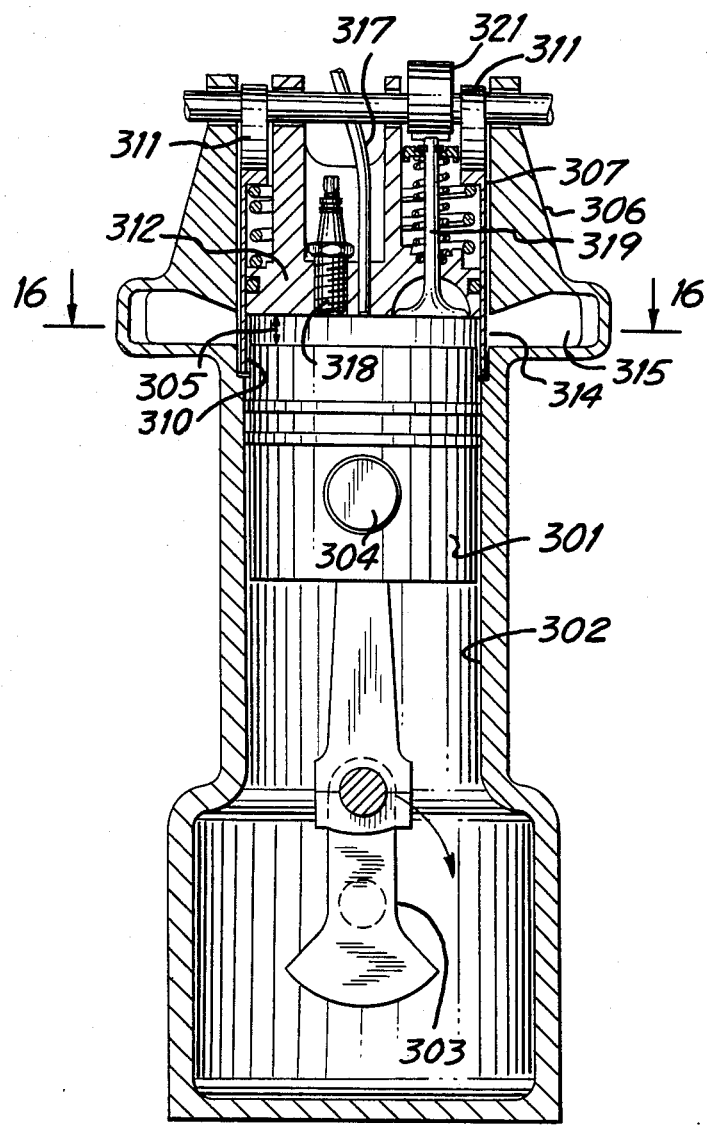
FIG. 15 is an end cross-sectional view of a four-stroke Otto cycle engine embodying the present invention.
Figure 16:
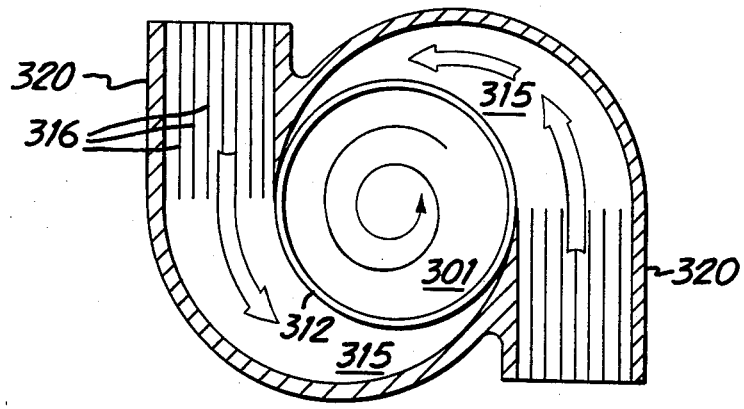
FIG. 16 is a top cross-sectional view of the engine shown in FIG. 15 taken at the induction passage, as indicated by the lines 16—16 in FIG. 15.

In FIGS. 15 and 16, a piston 301 in a cylinder 302 is driven by a crankshaft in a 4-stroke mode by a crank arm 303 and a wrist pin 304. The piston is shown at top dead center just as combustion takes place with clearance 305 between the smooth piston crown and head 306. The head clearance 305 is R/4 (R is the piston diameter) in dimension so that for a typical stroke length equal to the piston diameter or 2R, the clearance 305 of R/4 corresponds to a typical Otto cycle compression ratio of 8:1. The compressed volume is bounded by the sleeve valve 307 that rides in clearances in the lower cylinder and clearances in the head 306. These clearances, as Ricardo (1953) discusses, automatically adjust themselves so that the sleeve valve 307 expands by heat until perfect sliding contact with the outside wall is made which then extracts the heat and limits the expansion. The sleeve valve 307 extends beyond the piston 301 into a get-lost-volume 310 in the cylinder wall. This get-lost-volume is such that it may be zero and therefore act as a valve seat, or, if larger, such that trapped gases are not compressed forming squish. The sleeve valve 307 is spring-loaded open and actuated by two cams 311—it can be activated by rocker arms as in FIG. 13. The head portion 312 within the valve is supported by the camshaft but can be supported as in FIG. 13.

At top dead center at the start of the induction stroke, the sleeve valve is retracted to open the port area 314 to the plenum 315 for air induction as an axial vortex formed by the momentum of inlet air straightened by vanes 316 in volute air intakes 320.

The head 306 contains a fuel injector 317, spark plug 318, and exhaust valve 319. The fuel injector is an entirely standard type, but it is mounted axially so that the fuel spray will be axially symmetric and result in a vortex stratified charge. The spark plug 318 should have a spark ignition surface that is flush with the head 306 so as to present as small a perturbation to the rotational flow as possible. Such spark plugs are typical of aircraft ones. Similarly, the bottom surface of the exhaust valve 319 must be smooth so as not to perturb the vortex flow. The exhaust valve 319 is driven by a cam 321.

FIG. 16 shows the piston 301, the head 306 and the plenums 315 in the form of two volutes. The vanes 316 create an induction vortex 324 and an internal axial vortex 325. The induction area of the volutes at the vanes 316 is ⅛ that of the piston so that the induction vortex will have a velocity about 4 times that of the piston at the smaller radius of the piston. Hence the radial induction velocity of twice the piston velocity is still smaller (about ½) of the axial vortex and so that axial vortex will dominate the flow and prevent an annular or radial vortex from forming.

The timing diagram is identical to any four-stroke engine and so is not shown since 4-stroke engine timing is so well known. The only small difference is the cam shape for opening and closing of the induction sleeve valve 307. The port area is defined by the degree of opening of the sleeve valve. This area should be proportional to the piston velocity so that the ratio of induction radial to azimuthal velocity remains constant during induction.

Therefore the valve opening should be proportional to the sine (of the crank angle). This is the simplest cam to make and is just an off-center circle. In this fashion both the angular momentum as well as the radial momentum of the axial vortex remain constant during the induction stroke and hence the meridianal or radial circulation is minimal. This minimizes the heat loss.

VIII Conclusion

A class of positive displacement machinery is designed where there is definitive control of the heat flow from and to the working gas and its boundaries. The result is a major improvement in the thermal efficiency of such machinery. The method of control is negation of turbulent heat transfer by the creation of a quiescent near-laminar flow and more especially such near-laminar flow in a stable vortex that takes advantage of the symmetries of the confinement volume.

The attainment of extremely low heat transfer requires that at all times the induced turbulent velocities be small compared to the displacement velocity and the total displacement of the working gas in contact with a wall be a distance that is small compared to approximately 50 channel widths. This is the distance of fluid displacement in contact with a smooth wall at large Reynold's number necessary to induce fully turbulent flow. Proper induction port design and small displacement ensures near-laminar flow. Within this principle are the embodiments—(1) an articulated vane compressor-expander applicable to an automobile size heat pump; (2) an adiabatic air compressor; (3) a diesel engine where the separate functions of (a) pre-compression, (b) post-compression, combustion and pre-expansion, and (c) post-exhaust expansion are carried out in three separate cylinders; and (4) two and four stroke Otto cycle engines, preferably with fuel injection.

The heat efficiency of these designs in some cases may be made up to a factor of 2 better than current practice. This is because up until now, the heat transfer from gases to walls was not explicitly treated as being sensitive to the level of induced turbulence. Older textbooks such as Ricardo (1954) and Taylor (1966) barely even consider the turbulent flow pattern in engines. Recent modeling and measurements demonstrate unequivocably the induced turbulent flow patterns. The relationship between this flow pattern, the heat loss, resulting thermal efficiency and finally the necessary corrective measures is the foundation of the present invention.

References (1) Books

American Handbook of Physics, 1963, Prentice Hall, N.Y., pp. 256 and 257.

Ricardo, H. R., 1954, The Highspeed Internal Combustion Engine, Blackie & Son, London, England.

Taylor, C. F., The Internal Combustion Engine In Theory and Practice, 1966, Vol. 1, 2.

(2) Articles

Gossman, A. D., Johns, J. R., Watkins, A. P., 1978, "Development of Prediction Methods for In-Cylinder Processes in Reciprocating Engines," Proc. General Motors Symp., Detroit, Mich., p. 103. (FIG. 16)

Morse, A. P., Whitelaw, J. H., Yianneskis, M., June, 1979, "Turbulent Flow Measurements by Laser-Doppler Anemometry in Motored Piston-Cylinder Assemblies," *Journal of Fluid Engineering, Transactions of the ASME,* Vol. 101, p. 215. (FIG. 17).

(3) Patents

Brewer et al. U.S. Pat. No. 3,343,782, 9/26/67 (Rotor end sealing using sealing "washers" and relationship with the rotor bearings).

Ezop U.S. Pat. No. 3,346,176, 10/10/67 (Sealing between the rotor and the stripper landing and using Molybdenum Disulfide coating on stripper landings).

Brewer et al. U.S. Pat. No. 3,356,292, 12/5/67 (Notches on the inside wall of the housing to reduce sudden pressure changes. Bearing shoe and sealing shoe. Also specific materials and combinations of vanes.)

Pasek et al. U.S. Pat. No. 3,370,785, 2/27/68 ("Impeller" disc air filter mounted to the pulley.)

Adsit U.S. Pat. No. 3,401,872, 9/17/68 (Molded in place plastic rotor lining to hold sealing shoe. Bearing shoe is molded with the lining).

Brewer et al. U.S. Pat. No. 3,419,208, 12/31/68 [(1) Spot welded metal rotor liners to hold sealing and bearing shoes and alignment dowels. (2) Counterweights are curved to allow easy assembly. (3) Vanes molded to counterweight hubs. (4) Vane molded of reinforced thermosetting plastic. (5) Various fibers in vane plastic. (6) Ball bearing molded into housing. (7) Pulley hub smaller than the ball bearing to facilitate assembly.]

Rohde U.S. Pat. No. 3,437,264, 4/8/69 [(1) Rotor having an abradable coating to seal at the ends of the rotor and the housing in a recess. (2) Stripper landing and the coating relationship. (3) Coating contains MoS$_2$.]

Rohde U.S. Pat. No. 3,437,265, 4/8/69 (Wedge shaped space between bases of the shoes and their holding strips.)

Stiles et al. U.S. Pat. No. 3,844,696, 10/29/74 (Counter balanced two-vane extended rotor unit; shroud to reduce noise on the intake port.)

Ziehl U.S. Pat. No. 3,954,357, 5/4/76 (Standard two-vane unit restraining pilot sleeve in a guide track for the pin on which the vanes pivot.)

I claim:

1. An apparatus for the positive displacement volume compression or expansion of a gas comprising means defining a variable volume chamber for carrying out such compression or expansion, means for maintaining the variable volume chamber as a trapped volume not exposed to any gas at a pressure substantially different from that within it during substantially the entire time that gas is conducted into it, and inlet passage and port means shaped and sized for providing near-laminar flow of the gas into the chamber at a velocity along the principal direction of movement of the gas into the chamber substantially the same as that of a moving-boundary defining the variable volume chamber, thereby substantially to reduce heat flow to and from walls that define the chamber.

2. An apparatus according to claim 1 in which the variable volume chamber is defined by a piston movable in a cylinder and wherein the inlet port has an area of from about one-half of to about equal to the area of the piston.

3. An apparatus according to claim 2 wherein the inlet passage extends 360° around the cylinder as a plenum and further comprising a sleeve valve movable across the inlet port between closed and opened positions.

4. An apparatus according to claim 3 wherein the plenum is adapted to deliver the gas to the chamber with a velocity component tangential to the cylinder, thereby to induce axial vortex flow and inhibit the formation of a radial vortex and heat exchange attendant thereto.

5. An apparatus according to claim 4, the apparatus being an Otto cycle engine, and further comprising means for introducing fuel into the cylinder generally on the axis thereof, thereby at least partially to localize fuel and combustion in a region spaced apart from the cylinder walls while promoting combustion by centrifuging droplets of unburned fuel outwardly from the axis where air undepleted of oxygen is available to support combustion of the fuel.

6. An apparatus according to claim 4 or claim 5 and further comprising a crankshaft coupled to the piston to move it in the cylinder and means coupling the sleeve valve to the crankshaft to drive it in timed relation to reciprocation of the piston.

7. An apparatus according to claim 6 wherein the coupling means includes an overhead camshaft.

8. A two-stroke compound diesel engine comprising a supercharging piston-cylinder for supercharging a gas, a combustion piston-cylinder receiving gas from the supercharging cylinder and effecting combustion thereof and an exhaust piston-cylinder receiving exhaust gas from the combustion cylinder, the compression ratio in the supercharging cylinder being larger than the compression ratio of the combustion cylinder and being in the range from about 3:1 to about 8:1, the compression ratio in the combustion cylinder being in the range from about 3:1 to about 4:1 and the exhaust cylinder having a volume expansion ratio in the range from about 6:1 to about 9:1 in order to let down the exhaust to near atmospheric pressure, and supply duct and inlet port means leading to each piston-cylinder and shaped and sized for conducting gas into said piston-cylinder with near-laminar flow and at a velocity along the principal direction of movement of the gas into the piston-cylinder substantially the same as the velocity of the piston thereof.

9. An engine according to claim 8 wherein the supercharging cylinder includes an inlet port extending 360° around the head end and having an area of from about one-half to about equal to the cross-sectional area of the cylinder, a sleeve valve movable across the inlet port and a plenum adapted to supply a gas to the inlet port with a circumferential velocity component to induce an axial vortex and near-laminar flow in the supercharging cylinder.

10. An engine according to claim 9 and further comprising an insulated transfer duct and an insulated storage chamber for holding the supercharged heated air received from the supercharging cylinder for subsequent conduction into and scavenging of the combustion cylinder, the volume of said storage chamber being in the range from about one to about six times the combustion cylinder displacement volume.

11. An engine according to any of claims 8, 9 and 10 wherein the combustion cylinder includes an inlet port adjacent the bottom of the stroke and communicating with the supercharging cylinder by means of a volute that is adapted to establish an axial vortex in the combustion cylinder.

12. An engine according to any of claims 8, 9, and 10 wherein the radius and mean head clearance length of the combustion cylinder during combustion are generally equal so that the clearance volume to surface ratio of the combustion chamber during combustion is large, thereby to reduce heat loss.

13. An engine according to claim 11 wherein the head of the combustion cylinder is substantially flat and smooth and further comprising an exhaust valve in the combustion cylinder that is substantially co-axial with the cylinder axis, and means for injecting fuel substantially along the axis of the cylinder, whereby the axial vortex flow is substantially undisturbed and combustion is enhanced by the centrifuging of fuel droplets to regions where the air has not been depleted of oxygen.

14. An engine according to claim 12 wherein the combustion cylinder head is substantially flat and smooth and further comprising means for injecting fuel substantially along the axis of the combustion cylinder and an exhaust valve from the combustion cylinder located in the head generally midway between the axis and the wall of the cylinder, thereby to be positioned for more complete scavenging.

15. An engine according to claim 13 wherein the exhaust valve from the combustion cylinder includes a cylindrical sleeve that slides along cooled guide surfaces both within it and outside of it in the head of the combustion cylinder, thereby to provide a large heat transfer for cooling of the valve.

16. An engine according to claim 8 and further comprising an exhaust channel communicating the combustion cylinder with the exhaust cylinder, the exhaust channel being thermally insulated, smooth-walled and a volute and being adapted to conduct the combustion cylinder exhaust gases to the exhaust cylinder in a manner such as to induce an axial vortex, near-laminar flow in the exhaust cylinder.

17. An engine according to claim 16 wherein the exhaust cylinder includes an annular exhaust opening located generally at the half radius of the cylinder and having a width equal to about half the cylinder radius.

18. A four-stroke Otto engine comprising a piston-cylinder constituting a variable volume chamber for compression and expansion of a gas, exhaust valve means for maintaining the chamber as a trapped volume not exposed to any gas at a pressure substantially different from that within it during substantially the entire time that gas is inducted into it, inlet port means to the cylinder that extends entirely about the full circumference of the top part of the cylinder and is of a height not more than about one-half the radius of the cylinder and substantially equal to the stroke length divided by the compression ratio, a sleeve valve movable across the inlet port between opened and closed positions and passage means shaped and sized for conducting gas to and through the port with near-laminar flow at a velocity along the principal direction of movement of the gas substantially the same as that of the piston, thereby substantially to reduce heat flow to and from walls that define the chamber.

19. An engine according to claim 18 wherein the passage means is sized and shaped for supplying air to the inlet port chamber with a circumferential velocity component that is of the order of one to two times the radial induction velocity so as to induce a weak near-laminar axial vortex in the cylinder.

20. An engine according to claim 19 and further comprising means for injecting fuel into the combustion cylinder proximate to the axis thereof, thereby to create a stratified charge in order to reduce both the heat flow and the fraction of pollutants from the cooler unburned gases in contact with the cylinder walls.

21. An engine according to any of claims 18, 19 and 20 and further comprising a spark plug located proximate to where the fuel is injected and having electrode surfaces that are substantially flush with the head surface, thereby to reduce the surface friction of the axial vortex with the head surface.

22. An engine according to any of claims 18, 19 and 20 and further comprising an exhaust valve having a combustion-side surface that is smooth and substantially flush with the head surface to minimize friction with the gas flow in the cylinder and located generally at half radius to facilitate outflow of the exhaust gas.

23. A gas compressor for supplying substantially adiabatically compressed air or gas comprising a piston-cylinder constituting a variable volume chamber for compression of the air or gas, exhaust valve means in a cylinder head for maintaining the chamber as a trapped volume not exposed to any air or gas at a pressure substantially different from that within it during substantially the entire time that gas is inducted into it, and for exhausting compressed air or gas in the direction of the vortex flow, an inlet port extending 360° around the top end of the cylinder, a sleeve valve movable across the inlet port, passage means shaped and sized for conducting air to the inlet port with a substantial velocity component circumferentially of the cylinder to induce the formation of a near-laminar axial vortex flow of the inducted air or gas at a velocity in the principal direction of movement of the gas substantially the same as that of the piston to minimize heat flow between the air or gas and the piston and cylinder walls, and an insulated compressed air or gas delivery passage in the head.

24. An articulated vane machine for substantially adiabatic compression or expansion of a gas comprising a casing, a rotor carrying articulated vanes, the casing, rotor and vanes defining a variable volume, compression-expansion zone constituting a trapped volume not exposed to any gas at a pressure substantially different from that within it during substantially the entire time that gas is inducted into and out of it, induction passage means leading to the compression-expansion zone, and discharge passage means leading from the compression-expansion zone, both such passage means having shapes and cross-sectional areas along their lengths for providing near-laminar flows therein at a velocity substantially matching that of the rotor vanes, thereby to reduce heat flow between the gas and the rotor, vanes and casing walls of the machine.

25. A machine according to claim 24 wherein the casing walls in contact with the gas are made of a material having a low thermal conductivity, thereby to reduce heat flow within the walls and minimize the heat short circuit of the walls.

26. A Brayton cycle heat pump in which the compressor and the expander are articulated vane machines according to claim 24 or claim 25.

27. A heat pump according to claim 26 and further comprising means including an insulated shaft coupling and housing insulation for thermally isolating the compressor and expander to minimize the heat short circuit between the compressor and expander.

* * * * *